(12) United States Patent
Yumiki

(10) Patent No.: US 7,884,853 B2
(45) Date of Patent: Feb. 8, 2011

(54) IMAGING DEVICE HAVING A CONSECUTIVE SHOOTING MODE

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 530 days.

(21) Appl. No.: 11/976,957

(22) Filed: Oct. 30, 2007

(65) Prior Publication Data

US 2008/0055454 A1    Mar. 6, 2008

Related U.S. Application Data

(62) Division of application No. 11/706,957, filed on Feb. 16, 2007, now Pat. No. 7,305,181, which is a division of application No. 10/593,445, filed as application No. PCT/JP2005/003776 on Mar. 4, 2005, now Pat. No. 7,643,738.

(30) Foreign Application Priority Data

Mar. 19, 2004    (JP) ............................. 2004-079849

(51) Int. Cl.
     *H04N 5/228*    (2006.01)
(52) U.S. Cl. ............... 348/208.12; 348/208.4; 348/208.5; 348/370; 348/371; 396/155; 396/180; 396/322; 396/55
(58) Field of Classification Search ............ 348/208.99, 348/208.4–208.5, 208.12, 370–371; 396/55, 396/155, 180, 322
See application file for complete search history.

(56) References Cited

U.S. PATENT DOCUMENTS

| | | | |
|---|---|---|---|
| 5,557,358 | A | 9/1996 | Mukai et al. |
| 6,771,308 | B1 | 8/2004 | Yamamoto et al. |
| 2003/0147000 | A1 | 8/2003 | Shiraishi |
| 2003/0223011 | A1 * | 12/2003 | Miki ........................ 348/371 |
| 2004/0041919 | A1 | 3/2004 | Yamanaka |
| 2005/0129312 | A1 | 6/2005 | Ernst et al. |
| 2005/0190288 | A1 * | 9/2005 | Yamada ..................... 348/371 |
| 2005/0243175 | A1 | 11/2005 | Yamada et al. |
| 2007/0071426 | A1 | 3/2007 | Chujo et al. |
| 2007/0171979 | A1 | 7/2007 | Eerenberg et al. |

FOREIGN PATENT DOCUMENTS

| | | | |
|---|---|---|---|
| JP | 5-110912 A | 4/1993 |
| JP | 8-186758 A | 7/1996 |
| JP | 2000-13671 A | 1/2000 |

(Continued)

OTHER PUBLICATIONS

United States Office Action issued in U.S. Appl. No. 10/593,445 dated Apr. 17, 2009.

(Continued)

*Primary Examiner*—David L Ometz
*Assistant Examiner*—Antoinette T Spinks
(74) *Attorney, Agent, or Firm*—McDermott Will & Emery LLP

(57) ABSTRACT

An imaging device, such as a digital camera, has a mechanism for compensating an image blur caused by hand jiggling and is capable of consecutively shooting, through one operation of a shutter operation section (36), frames of an image in a state where the mechanism (20) is operational and in a state where the mechanism is not operational.

13 Claims, 15 Drawing Sheets

FOREIGN PATENT DOCUMENTS

| | | |
|---|---|---|
| JP | 2000-102022 | 4/2000 |
| JP | 2000-125185 | 4/2000 |
| JP | 2000-295535 A | 10/2000 |
| JP | 2001-117129 A | 4/2001 |
| JP | 2002-359769 | 12/2002 |
| JP | 2003-224812 | 8/2003 |
| JP | 2003-264794 | 9/2003 |
| JP | 2003-304443 | 10/2003 |
| JP | 2004-088409 | 3/2004 |
| JP | 2005-64699 A | 3/2005 |
| JP | 2005-079915 | 3/2005 |
| JP | 2005-204185 | 7/2005 |
| WO | WO 2004/010711 A1 | 1/2004 |

OTHER PUBLICATIONS

Japanese Office Action issued in Japanese Patent Application No. 2006-295663, dated Jul. 24, 2009.

Japanese Office Action issued in Japanese Patent Application No. 2009-056124, dated Jul. 24, 2009.

Japanese Office Action (Notice of Reasons for Rejection), issued in Japanese Patent Application No. 2009-056124, dated Oct. 7, 2009.

Japanese Notice of Reasons for Rejection issued in Japanese Patent Application No. JP 2006-295663, dated Jan. 26, 2009.

* cited by examiner

FIG. 6
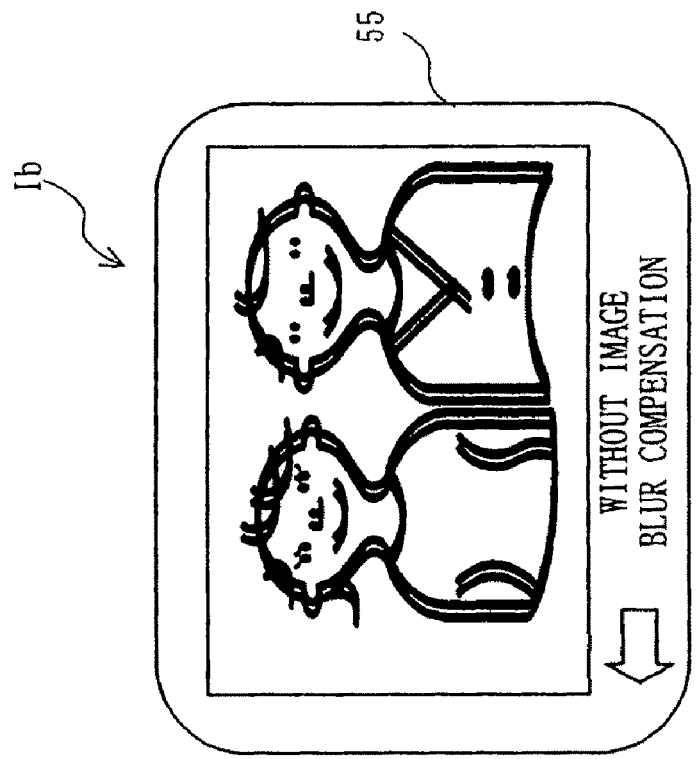
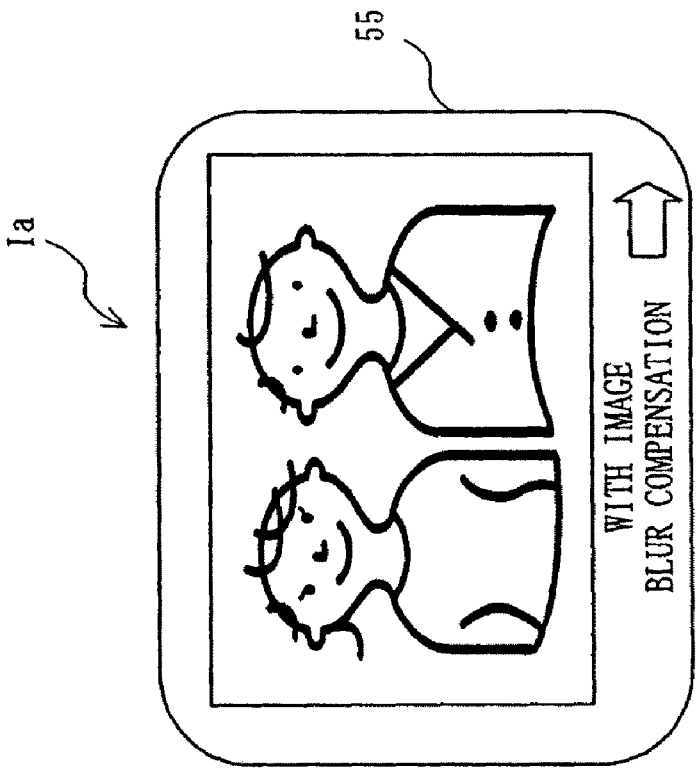

IMAGING DEVICE HAVING A CONSECUTIVE SHOOTING MODE

RELATED APPLICATIONS

This application is a Divisional of U.S. Application Ser. No. 11/706,957, filed Feb. 16, 2007, now U.S. Pat. No. 7,305,181, which is a Divisional of U.S. Ser. No. 10/593,445, filed Sep. 19, 2006, now U.S. Pat. No. 7,643,738, which is a 371 of International Application No. PCT/JP2005/003776, filed Mar. 4, 2005, claiming priority of Japanese Application No. 2004-079849, filed Mar. 19, 2004, the entire contents of each of which are hereby incorporated by reference.

TECHNICAL FIELD

The present invention relates to an imaging device having a function of compensating an image blur caused by hand jiggling, and more particularly to an imaging device such as a digital still camera having a consecutive shooting function with which a predetermined number of frames of an image can be shot through one shutter operation in a consecutive manner.

BACKGROUND ART

In recent years, an imaging device (hereinafter, referred to as "digital camera") such as a digital still camera and a digital video camera, which is capable of converting an optical image of an object to an electrical image signal to be outputted therefrom, has rapidly come into widespread use. There has been brought a dramatic improvement in reducing a size and a weight of a digital camera and in increasing magnification of optical zoom, markedly enhancing user-friendliness. As a result, the digital camera has become an imaging device which can be much commonly handled by a general user.

However, if the downsized and light weight digital camera having the zoom of large magnification is used by a person who is not skilled in shooting, hand jiggling is easily caused upon shooting. And if the hand jiggling is caused, shot images cannot be stable, resulting in markedly deteriorated quality of the shot images.

As a digital camera enabling a reduction in quality deterioration, which is caused by the hand jiggling, of shot images, for example, as disclosed in patent documents 1 and 2, many digital cameras carrying mechanisms for compensating influence of the image blur caused by the hand jiggling have been developed and already commercialized.

And a consecutive shooting function, in the digital camera, with which a plurality of frames of an image can be consecutively shot through one shutter operation performed by a shooter has been upgraded. Furthermore, a digital camera having a function, such as an automatic bracket function, of shooting while changing shooting conditions such as an exposure has become popular.

Patent document 1: Japanese Laid-Open Patent Publication No. 2000-13671
Patent document 2: Japanese Laid-Open Patent Publication No. 2001-117129

DISCLOSURE OF THE INVENTION

Problems to be Solved by the Invention

In general, when a digital camera having a function of compensating the image blur caused by the hand jiggling is used for shooting, even if a shutter speed is slow, influence of the image blur caused by the hand jiggling is automatically compensated through operating a mechanism for compensating the image blur caused by the hand jiggling. Therefore, even without emitting a flash for, for example, indoor shooting by means of flash emitting means such as a strobe device, it is made possible to shoot images having colors verge on natural colors and atmosphere, with reduced image quality deterioration as compared with a case where a digital camera having no function of compensating the image blur caused by the hand jiggling is used for shooting.

However, operating the function of compensating the image blur caused by the hand jiggling does not always lead to obtaining, in any shooting sites and under any shooting conditions, images having quality deterioration reduced. In other words, basically, shooting images having quality deterioration reduced heavily depends on a shooting technique of a shooter.

Furthermore, since operating the function of compensating the image blur caused by the hand jiggling itself consumes power, maximum shooting duration available when the function of compensating the image blur caused by the hand jiggling in the digital camera is operated becomes naturally shorter than that available when the function of compensating the image blur caused by the hand jiggling is not operated. As stated above, from the viewpoints of shot image quality and operable time, the function of compensating the image blur caused by the hand jiggling is not always the best measure for the shooter of the digital camera and there may be a case where it is better not to use the function of compensating the image blur caused by the hand jiggling. When not using the function of compensating the image blur caused by the hand jiggling, it is essential for the shooter to acquire a shooting technique which allows high quality images to be shot even without using the function of compensating the image blur caused by the hand jiggling.

As it were, a shooter who has acquired an adequate shooting technique could shoot, by using a digital camera having no function of compensating the image blur caused by the hand jiggling, images having quality equal to or greater than quality of images shot by a digital camera having the function of compensating the image blur caused by the hand jiggling. In this case, the digital camera having no function of compensating the image blur caused by the hand jiggling has an advantage of being lighter and less expensive than the digital camera having the function of compensating the image blur caused by the hand jiggling since there included is no function of compensating the image blur caused by the hand jiggling. In addition, when images are shot, if necessary, without using the function of compensating the image blur caused by the hand jiggling, which the digital camera has, power consumption can be reduced, making operable time of the digital camera longer.

As stated above, in order to acquire a shooting technique which allows, even without using the function of compensating the image blur caused by the hand jiggling, shooting images having a reduced quality deterioration caused by the hand jiggling, a shooter is required to gain experience by shooting a wide variety of scenes. However, for general people who use a digital camera only at a special event or the like, it is not easy to gain such shooting experience. As a result, it is very difficult for a person who is not skilled in shooting to shoot images having no influence caused by hand jiggling without using the function of compensating the image blur caused by the hand jiggling.

In order to improve a shooting technique, it is effective for such a general user of a digital camera to repeat shooting practices by using a digital camera having the function of compensating the image blur caused by the hand jiggling; by shooting a single common object under unchanged shooting conditions both with and without use of the function of compensating the image blur caused by the hand jiggling; by comparing and evaluating obtained images on the spot; and then by redoing, based on evaluations thereof, shooting. Specifically, a shooter himself or herself makes a comparison on the spot between an image, having image quality deterioration reduced, shot by operating the function of compensating the image blur caused by the hand jiggling and an image, having an image quality deterioration not reduced, shot by not operating the function of compensating the image blur caused by the hand jiggling. And repeatedly shooting while trying to reduce an image quality deterioration, even without operating the function of compensating the image blur caused by the hand jiggling, is effective for improving the shooting technique.

As a training method for shooting in the above-mentioned manner, it may be considered that switching "available/unavailable" states of the function of compensating the image blur caused by the hand jiggling, a shooter shoots a single common object under unchanged shooting conditions (except a condition for "available/unavailable" switching of the function of compensating the image blur caused by the hand jiggling) and makes a comparison between resultant shots thereof. However, in order to switch the "available/unavailable" states of the function of compensating the image blur caused by the hand jiggling, the shooter is required to perform an operation along with a time passage.

Therefore, when an object is moving, it is very difficult to shoot the object in an unchanged state between before and after switching the "available/unavailable" states of the function of compensating the image blur caused by the hand jiggling. Even if the moving object can be tracked and shot after switching the "available/unavailable" states of the function of compensating the image blur caused by the hand jiggling, since a background has changed, an obtained image is not identical to that obtained before switching the "available/unavailable" states of the function of compensating the image blur caused by the hand jiggling. Since the object is moving, shooting environment conditions including a state of light change between before and after switching the "available/unavailable" states of the function of compensating the image blur caused by the hand jiggling.

What the shooting environment conditions refer to are not something which the shooter himself or herself can deliberately create by using shooting equipment such as artificial lighting, for example, a strobe device and can easily change. In other words, the shooting environment conditions are something such as sunlight and reflected light that sunlight or light emitted by artificial lighting is reflected from a building or the like, which the shooter can neither deliberately create nor easily change. As an example of a change in shooting conditions under a shooting environment, a case where an object moves and as a result, comes to be backlit by the sun is typical.

On the other hand, when an object is still, a change in shooting conditions under a shooting environment between before and after switching the "available/unavailable" states of the function of compensating the image blur caused by the hand jiggling is apparently small in a case where an object is moving. However, when a shooter holds a digital camera with his or her hands for shooting, the shooter's posture of holding the digital camera changes between before and after switching the "available/unavailable" states of the function of compensating the image blur caused by the hand jiggling, resulting in a change in the shooting conditions such as a background or the like. In order to suppress the change in the shooting conditions, which results from a change in the shooter's posture, utilization of a tripod stand or the like for holding the digital camera is considered. To this end, however, the shooter is required to carry holding equipment such as the tripod stand or the like, leading to botheration, inconvenience, and a burden.

And even if the change in the shooting conditions between before and after switching the "available/unavailable" states of the function of compensating the image blur caused by the hand jiggling can be suppressed by holding the digital camera through the utilization of the holding equipment such as the tripod stand or the like, it remains unchanged that the shooter is forced to carry out a bothersome operation of the digital camera for switching the "available/unavailable" states of the function of compensating the image blur caused by the hand jiggling.

Therefore, an object of the present invention is to provide an imaging device capable of shooting while continuously switching an image blur compensation mechanism, under unchanged shooting environment conditions irrespective of whether an object is still or moving, wherein a shooter is not required to carry special holding equipment and to perform a switching operation of image blur compensation.

Solution to the Problems

An imaging device (1a) has an image blur compensation means (20) for compensating a blur of an image to be inputted to an imaging sensor (4) via an imaging optical system (L) and is operable to shoot in a consecutive shooting mode in which a plurality of frames (Ia and Ib) of the image are consecutively shot through one operation of a shutter operation section (36) and shot image signals are generated, the imaging device comprising: operation means (39 and 40) for setting the consecutive mode; recording means (12) for recording the plurality of the consecutively shot frames (Ia and Ib) of the image; and display means (55) for displaying the frames of the shot image, wherein when the consecutive shooting mode is set by the operation means (39 and 40), in response to the one operation of the shutter operation section, shooting with and without compensation, on the image to be inputted to the imaging sensor (4), using the image blur compensation means (20) is consecutively performed and the plurality of the shot frames of the image can be displayed on the display means (48 and 55).

EFFECT OF THE INVENTION

According to the present invention, when consecutive shooting is set on a digital camera or the like, in a consecutive manner and through one shutter operation, an image blur compensation mechanism is operated, whereby shooting with compensation of an image entering into an image sensor and shooting is performed, and the image blur compensation mechanism is not operated, whereby shooting without compensation of an image entering into an image sensor and shooting is performed. In other words, a shooter can see a reduction in image quality deterioration caused by hand jiggling through displaying or printing and through comparing frames of an image of an object, which are shot under substantially unchanged conditions except conditions regarding availability of the image compensation.

Accordingly, the shooter can effectively practice to acquire a technique of shooting having image quality deterioration reduced even when the image blur compensation mechanism is not operated, while upon shooting, varying a way of holding the digital camera or the like, a shooting posture, and a level of force exerted for a shutter operation, by checking a way of shooting and the frames of the shot image.

As stated above, by using the imaging device according to the present invention, the shooter can instantaneously make a comparison to review on the spot by displaying 2 frames, being adjacent to each other, of the image consecutively shot with and without the image blur compensation. Further, a display of the frames of the shot image can be enlarged, thereby exhibiting effect of good viewability and easy reviewing for the shooter.

Further, by using the imaging device according to the present invention, which has the image blur compensation mechanism, the shooter can easily practice shooting having the image quality deterioration reduced without operating the image blur compensation mechanism, thereby enhancing convenience of the imaging device.

BRIEF DESCRIPTION OF THE DRAWINGS

FIG. 6 is a diagram illustrating frames, displayed on a display section, of an image shot in the second consecutive shooting mode according to the first consecutive shooting mode.

DESCRIPTION OF THE REFERENCE CHARACTERS

Figure 1:
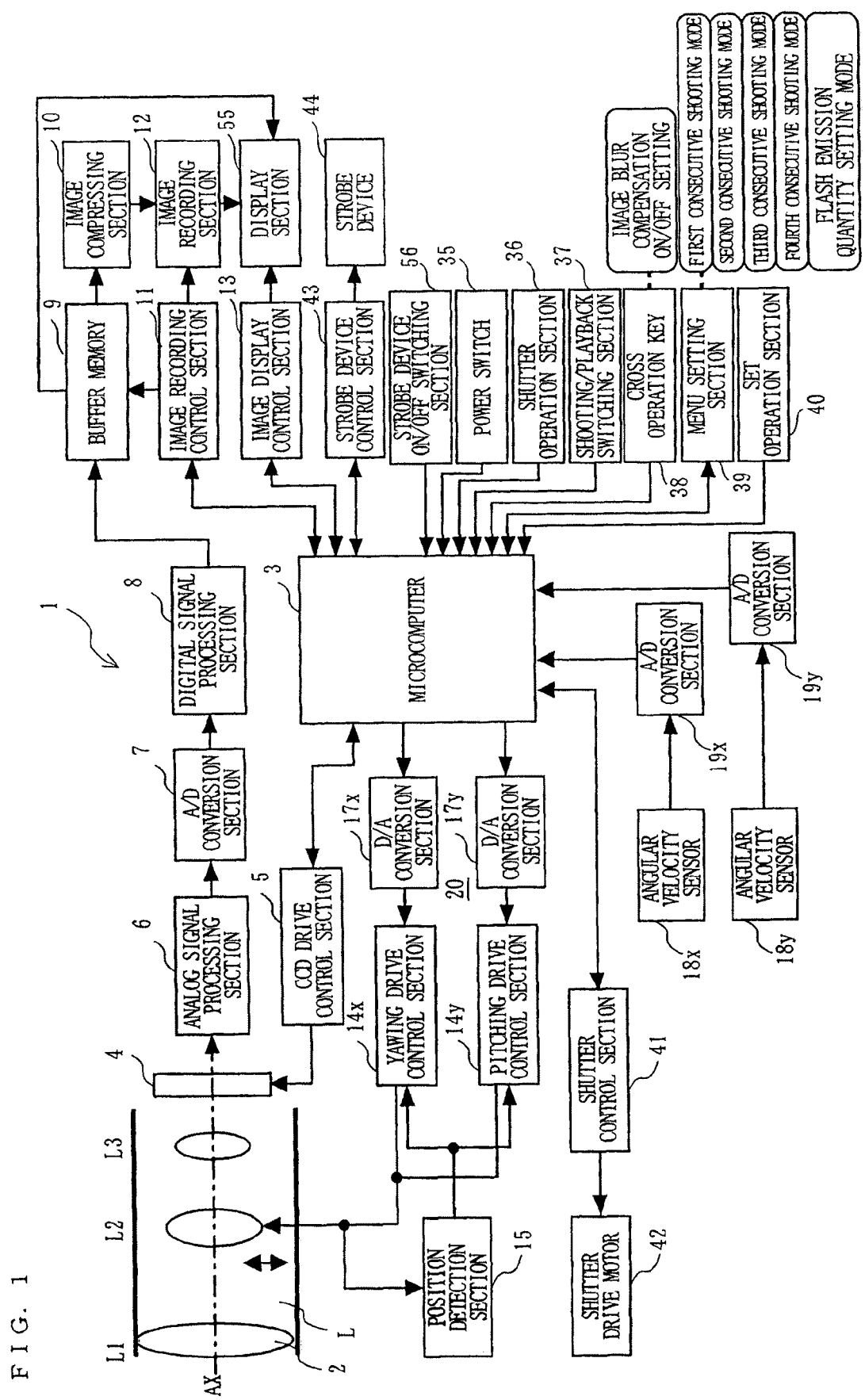
FIG. 1 is a block diagram illustrating a control system of a digital camera according to a first embodiment of the present invention.

L imaging optical system
L2 image blur compensation lens unit
C housing
1a, 1b digital camera
2 imaging lens unit
3 microcomputer
4 imaging sensor
8 digital signal control section
10 image compressing section
12 image recording section
14x yawing drive control section
14y pitching drive control section
18x, 18y angular velocity sensors
20 image blur compensation mechanism
35 power switch
36 shutter operation section
38 cross operation key
39 menu setting section
40 SET operation section
42 shutter drive motor
44 strobe device
46 image signal output section
48 display device
50 printing data output section
52 printer
55 display section
56 strobe device on/off switching section
57 zoom operation section
60 flash emission quantity setting menu

BEST MODE FOR CARRYING OUT THE INVENTION

First Embodiment

FIG. 1 is a block diagram illustrating a control system of a digital camera according to a first embodiment of the present invention. On a digital camera 1a, a microcomputer 3 is mounted, controlling respective control sections of the digital camera 1a.

With reference to FIG. 1, FIG. 2, FIG. 3, FIG. 4, FIG. 5, FIG. 6, FIG. 7, FIG. 8, FIG. 9, FIG. 10, and FIG. 11, the digital camera, which is an imaging device according to the first embodiment of the present invention, will be described. As shown in FIG. 1, the digital camera 1a includes an imaging lens unit 2, a microcomputer 3, an imaging sensor 4, a CCD drive control section 5, an analog signal processing section 6, an A/D conversion section 7, a digital signal control section 8, a buffer memory 9, an image compressing section 10, an image control recording section 11, an image recording section 12, an image display control section 13, a yawing drive control section 14x, a pitching drive control section 14y, a position detecting section 15, a D/A conversion section 17x, a D/A conversion section 17y, an angular velocity sensor 18x, an angular velocity sensor 18y, an A/D conversion section 19x, an A/D conversion section 19y, a power switch 35, a shutter operation section 36, a shooting/playback switching section 37, a cross operation key 38, a menu setting section 39, a SET operation section 40, a shutter control section 41, a shutter drive motor 42, a strobe device control section 43, a strobe device 44, a display section 55, and a strobe device on/off switching section 56.

The imaging lens unit 2 has an imaging optical system L including a plurality of lenses L1, L2, and L3 and is capable of changing a shooting mode thereof in a telescopic manner and a wide-angle manner. The microcomputer 3 receives signals respectively outputted from the power switch 35, the shutter operation section 36, the shooting/playback switching section 37, the cross operation key 38, the menu setting section 39, and the SET operation section 40, and controls entire operations of the digital camera 1a.

Figure 2:
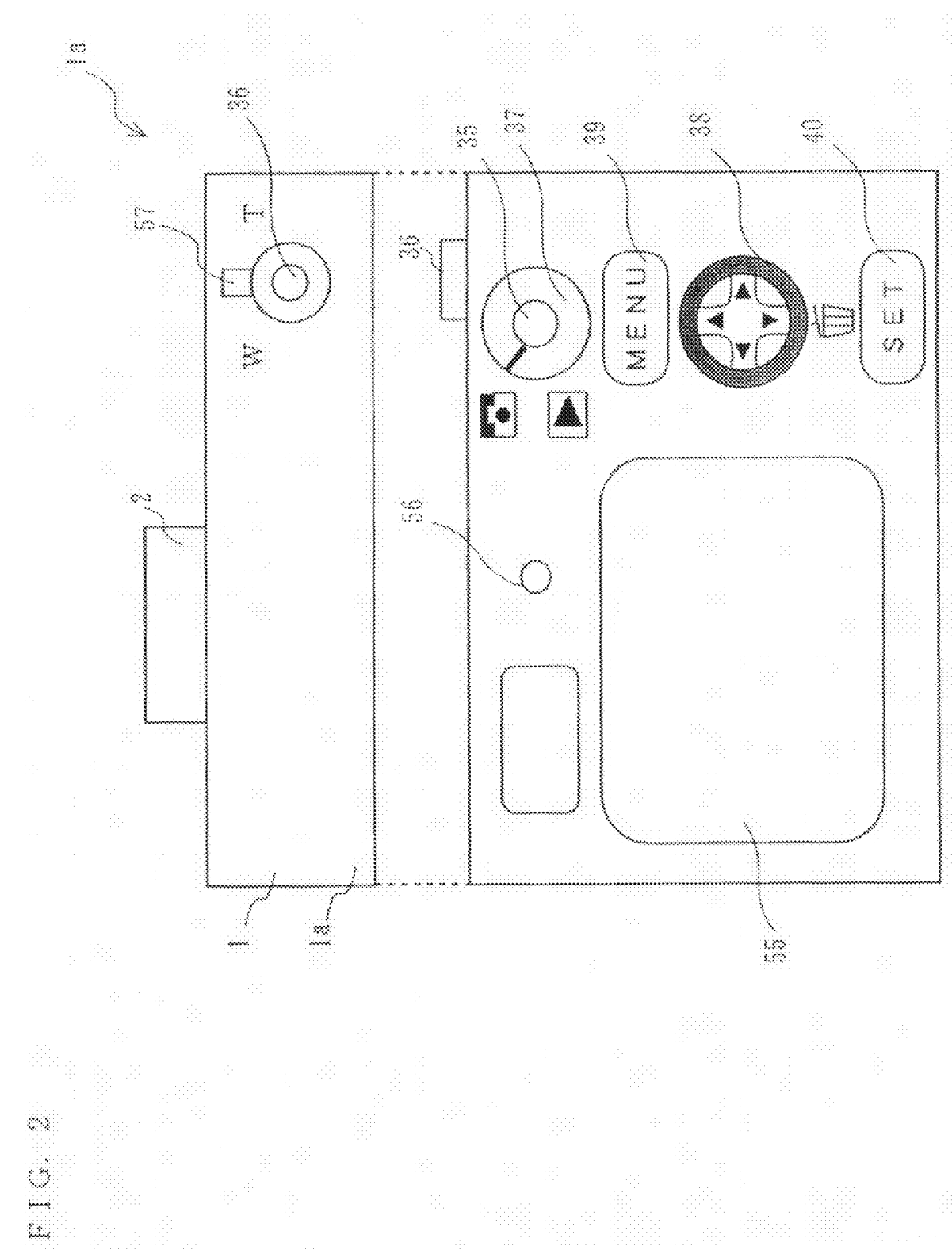
FIG. 2 is a diagram illustrating an external view of the digital camera according to the first embodiment of the present invention.

In FIG. 2, an upper part shows a top view of the digital camera 1a and a lower part shows a rear view of the digital camera 1a. The digital camera 1a has a housing C which is supported by a shooter when shooting an object. On a rear surface of the housing C, provided are the power switch 35, the shooting/playback switching section 37, the cross operation key 38, the menu setting section 39, the SET operation section 40, the display section 55 comprising an LCD monitor, and the strobe device on/off switching section 56

In addition, on a top surface, the shutter operation section 36 and a zoom operation section 57 are provided. The zoom operation section 57 is provided surrounding the shutter operation section 36, so as to be pivotable coaxially about the shutter operation section 36. In a state where the digital camera 1a is switched to a shooting mode by means of the shooting/playback switching section 37, the imaging optical system L having the imaging lens unit 2 is controlled by the microcomputer 3 so as to be telescopic when the zoom operation section 57 is rotated clockwise and to be wide-angle when the zoom operation section 57 is rotated counterclockwise.

The power switch 35 is an operation member with which a shooter carries out power ON/OFF switching of the digital camera 1a. In the present specification, operations, except shooting, to be performed by a shooter, as described herein, may be performed by a user other than a shooter. However, in order to avoid redundancy of expression, it is simply described that such operations are performed by a shooter.

The shooting/playback switching section 37 is an operation member for switching between a shooting mode and a payback mode by rotating a lever. The cross operation key 38 is an operation member whose upper and lower portions and/or right and left portions are pressed by a shooter to select a desired operation menu from various operation menus displayed, on the display section 55, through operating the menu setting section 39 and to cause the microcomputer 3 to execute the selected operation menu. The menu setting section 39 is an operation member for displaying the various operation menus on the display section 55. The SET operation section 40 is an operation member for returning, through a shooter's operation, a display of the various operation menus to a previous state.

The shutter control section 41 responds to a timing signal generated through a shooter's operation of the shutter operation section 36, drives the shutter drive motor 42 based on a control signal from the microcomputer 3, and causes a shutter to operate. The strobe device control section 43, responding to the timing signal generated through a shooter's operation of the shutter operation section 36 and based on the control signal from the microcomputer 3, causes the strobe device 44 to emit light.

In a state where power is turned on by a shooter by means of the power switch 35, when a light quantity which the imaging sensor 4 receives from the imaging optical system L, i.e., an output of an image signal from the imaging sensor 4, is equal to or less than a predetermined value, the strobe device 44 is caused by the strobe device control section 43 to automatically emit light in conjunction with a shutter operation. On the other hand, the strobe device 44 is controlled by the microcomputer 3 so as not to emit light when the output of the imaging signal from the imaging sensor 4 is equal to or greater than the predetermined value.

The strobe device on/off switching section 56 can be set so that the strobe device 44 is caused by the microcomputer 3 to emit light through an "ON" operation and not to emit light through an "OFF" operation irrespective of the output from the imaging sensor 4.

Using the cross operation key 38, as one of operations selected thereby, selection of operating and not operating an image blur compensation mechanism 20 described later can be made.

The menu setting section 39 is an operation member with which a shooter sets various operations of the digital camera 1a. For example, a consecutive shooting mode, among a plurality of kinds of the consecutive shooting mode, can be selected, in which when a shooter operates the shutter operation section 36 one time, the shutter drive motor 42 is drive-controlled by the microcomputer 3 so as to cause the shutter to consecutively operate 2 or more times for a predetermined period of time (for example, 0.3 second), performing consecutive shooting. Shown in FIG. 1 is an example in which a shooter can make a selection of a first, a second, a third, and a fourth consecutive shooting modes and a flash light emitting quantity setting mode by operating the menu setting section 39. A shooter operates the SET operation section 40 to determine a selected mode among the plurality of consecutive shooting modes.

As stated above, respective operation members are operated by a shooter or a user, thereby executing required functions such as selection and setting. Hereinafter, in order to avoid redundancy of expression, descriptions in which execution of various functions is performed by a shooter or a user using respective operation members are omitted and the execution of various functions will be described simply as if the execution of various functions were performed by the respective operation members.

In a state where the first consecutive shooting mode is selected by the menu setting section 39, when the strobe device on/off switching section 56 is "on", the microcomputer 3 causes, upon a first shutter operation, the strobe device to emit light and not to emit light upon a second shutter operation and thereafter. Of course, needless to say, in the first consecutive shooting mode, the strobe device may be caused to emit light even upon the second shutter operation and thereafter.

And when the second consecutive shooting mode is selected, irrespective of a setting state of the strobe device on/off switching section 56, the strobe device is caused not to emit light upon a first shutter operation and to emit light upon a second shutter operation and thereafter.

On the other hand, when the third consecutive shooting mode is selected, the strobe device is controlled by the microcomputer 3 not to emit light upon any shutter operation even in a state where the strobe device on/off switching section 50 is "on".

Next, the image blur compensation mechanism 20 in each consecutive shooting mode will be described. When the image blur compensation mechanism 20 is selected so as to be operational by the cross operation key 38 while shooting in the first consecutive shooting mode selected by the menu setting section 39, the image blur compensation mechanism 20 is controlled by the microcomputer 3 so that an image blur compensation function is operated upon each shutter operation. And when the image blur compensation mechanism 20 is selected so as to be operational, the image blur compensation mechanism 20 is controlled by the microcomputer 3 so that the image blur compensation function is not operated upon each shutter operation.

Furthermore, when the second consecutive shooting mode is selected by the menu setting section 39, irrespective of whether or not the image blur compensation mechanism 20 is selected by the cross operation key 38 so as to be operational, the image blur mechanism 20 operates upon a first shutter operation so as to operate the image blur compensation function. And the image blur compensation mechanism 20 is controlled by the microcomputer 3 so that the image blur compensation function does not operate upon a second shutter operation and thereafter.

And when shooting in a third consecutive shooting mode selected, irrespective of whether or not the image blur compensation mechanism 20 is selected so as to be operational, the image blur compensation mechanism 20 is controlled by the microcomputer 3 so that when shooting a first frame, the image blur compensation function is operational and when shooting a second frame, the image blur compensation function is not operational.

Next, the imaging sensor 4 preferably comprises a CCD (Charge Coupled Device) and converts an optical image, formed by the imaging optical system L having the imaging lens unit 2, to an electrical image signal. The imaging sensor 4 is drive-controlled by the CCD drive control section 5.

The image signal outputted by the imaging sensor 4 is processed by the analog signal processing section 6, the A/D conversion section 7, the digital signal processing section 8, the buffer memory 9, and the image compressing 10 in a sequential manner. The image signal is transmitted from the imaging sensor 4 to the analog signal processing section 6. The analog signal processing section 6 performs analog signal processing, such as gamma processing, for the image signal outputted from the image sensor 4. The image signal processed by the analog signal processing section 6 is transmitted to the A/D conversion section 7. The A/D conversion section 7 converts an analog image signal outputted from the analog signal processing section 6 to a digital signal.

The image signal which has been converted to the digital signal by the A/D conversion section 7 is transmitted to the digital signal processing section 8. The digital processing section 8 performs digital signal processing, such as noise removal and edge enhancement, for the image signal converted to the digital signal by the A/D conversion section 7. Further, the image signal is transmitted from the digital signal processing section 8 to the buffer memory 9. The buffer memory 9 temporarily stores the image signal processed by the digital signal processing. The buffer memory 9 preferably comprises RAM (Random Access Memory).

The image signal is transmitted by an instruction of the image control recording section 11 from the buffer memory 9 to the image compressing section 10. The image compressing section 10 compresses, by an instruction of the image recording control section 11, data of the image signal into a predetermined size. The data of the image signal is compressed at a predetermined rate and comes to be of a smaller size than an original size. As a compression method, for example, JPEG (Joint Photographic Experts Group) format may be used. The compressed image signal is transmitted from the image compressing section 10 to the image recording section 12.

On the other hand, the microcomputer 3 transmits control signals to the image recording control section 11 and the image display control section 13. The image recording control section 11 controls the image recording section 12 based on the control signal transmitted from the microcomputer 3. The image display control section 13 controls the display section 55 based on the control signal from the microcomputer 3.

The image recording section 12 is an internal memory and/or a removable memory for recording an image signal based on an instruction of the image recording control section 11. The image recording section 12 records the image signal together with necessary information based on the instruction of the image recording control section 11. The necessary information to be stored together with the image signal includes a date and time when an image is shot, focal length information, shutter speed information, aperture value information, shooting mode information and the like.

The display section 55, based on an instruction from the microcomputer 3 to the image display control section 13, displays the image signal stored in the image recording section 12 or the buffer memory 9 as a visible image. As a display form of the display section 55, there are one form in which only an image signal is displayed and another form in which displayed are an image signal obtained by operating the menu setting section 39 and information at the time of shooting, for example, such as focal length information, shutter speed information, aperture value information, shooting mode information, in-focus condition information and the like.

There are further display forms in which for example, 2 frames consecutively shot are displayed so as to be disposed right and left by an instruction from the microcomputer 3 to the image display control section 13 and in which the 2 frames consecutively shot are enlarged and displayed by operating an enlarging display operation section.

The imaging optical system L comprises 3 lens units L1, L2, and L3. In the imaging optical system L, the lens unit L2 serves as an image blur compensation lens unit and is caused to move in a plane perpendicular to an optical axis so as to decenter the optical axis, thereby playing a role of shifting an image obtained by the imaging sensor 4.

Figure 3:
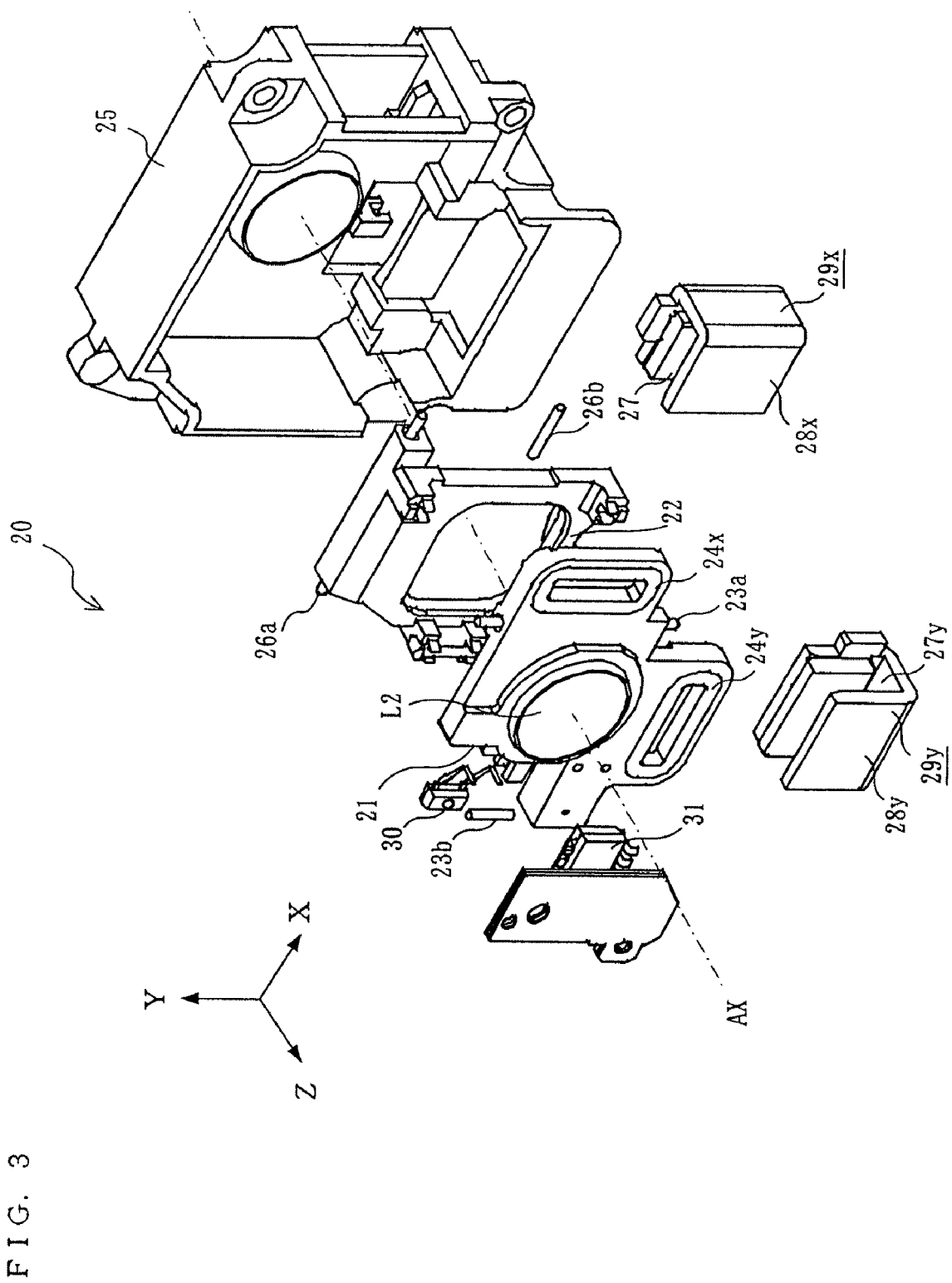
FIG. 3 is a diagram illustrating an exploded perspective view of an image blur compensation mechanism of the first embodiment of the present invention.

The yawing drive control section 14$x$ and the pitching drive control section 14$y$ drive-control the image blur compensation lens unit, i.e., the L2 lens unit, in 2 directions perpendicular to the optical axis AX, i.e., an X and a Y directions shown in FIG. 3. Hereinafter, the X direction and the Y direction are referred to as a yawing direction and a pitching direction, respectively.

The position detecting section 15 is a detector for detecting a position of the L2 lens unit and forms a feedback control loop for controlling the second lens unit L2 together with the yawing drive control section 15$x$ and the pitching drive control section 15$y$. The L2 lens unit, the yawing drive control section 14$x$, and the pitching drive control section 14$y$ are included in a part of the image blur compensation mechanism 20 for controlling the optical axis AX of an image shooting light.

The angular velocity sensors 18$x$ and 18$y$ are sensors for detecting motions of the digital camera 1$a$ itself including the imaging optical system L and with reference to an output in a state where the digital camera 1$a$ remains still, output both positive and negative angular velocity signals in accordance with a direction in which the digital camera 1$a$ moves. The angular velocity sensors 18$x$ and 18$y$ are provided to detect motions in the 2 yawing and the pitching directions, respectively. As stated above, the angular velocity sensors 18$x$ and 18$y$ function as a motion detector for detecting motions of the digital camera 1$a$ caused by hand jiggling or other vibrations. The output from the angular velocity sensors 18$x$ and 18$y$ undergo filter processing, amplifier processing and the like, is converted by the A/D conversion sections 19$x$ and 19$y$ to a digital signal, which is inputted to the microcomputer 3.

The microcomputer 3 obtains a drive-control amount (control signal) for the L2 lens unit, which is required for motion compensation, by performing filtering, integral processing, phase compensation, gain adjustment, clip processing and the like for the outputted signal provided from the angular velocity sensors 18$x$ and 18$y$ via the A/D conversion sections 19$x$ and 19$y$. The obtained control signal is outputted via the D/A conversion sections 17$x$ and 17$y$ to the yawing drive control section 14$x$ and the pitching drive control section 14$y$. In other words, the yawing drive control section 14$x$ and the pitching drive control section 14$y$ drives the L2 lens unit based on the control signal, thereby compensating a motion of the image caused by the motion of the digital camera 1$a$.

FIG. 3 shows an example of a configuration of the image compensation mechanism 20 (part of the image blur compensation mechanism) which drives the L2 lens unit in the imaging optical system L in the directions perpendicular to the optical axis AX. The L2 lens unit is fixed on a pitching moving frame 21. The pitching moving frame 21 is held in a slidable manner in a Y direction to a yawing moving frame 22 via 2 pitching shafts 23$a$ and 23$b$. A coils 24$x$ and 24$y$ are fixed on the pitching moving frame 21.

The yawing moving frame 22 is held in a slidable manner in an X direction to a fixed frame 25 via yawing shafts 26$a$ and 26$b$.

A magnet 27$x$ and a yoke 28$x$ are held to the fixed frame 25 and are included, together with the coil 24$x$, in an actuator 29$x$. Similarly, the magnet 27$y$ and the yoke 28$y$ are held to the fixed frame 25 and are included, together with the coil 24$y$, in the actuator 29$y$.

A light emitting element 30 is fixed to the pitching moving frame 21. A light receiving element 31 is fixed to the fixed frame 25, receives light emitted from the light emitting element 30, and detects two-dimensional position coordinates. The light emitting element 30 and the light receiving element 31 are included in the position detection section 15 of the image blur compensation mechanism.

With reference to FIGS. 4 to 10, an operation in which the imaging device, having the above-mentioned configuration, according to the first embodiment of the present invention shoots 2 frames of an image in each consecutive shooting mode will be described.

<First Consecutive Shooting Mode>

Figure 4:
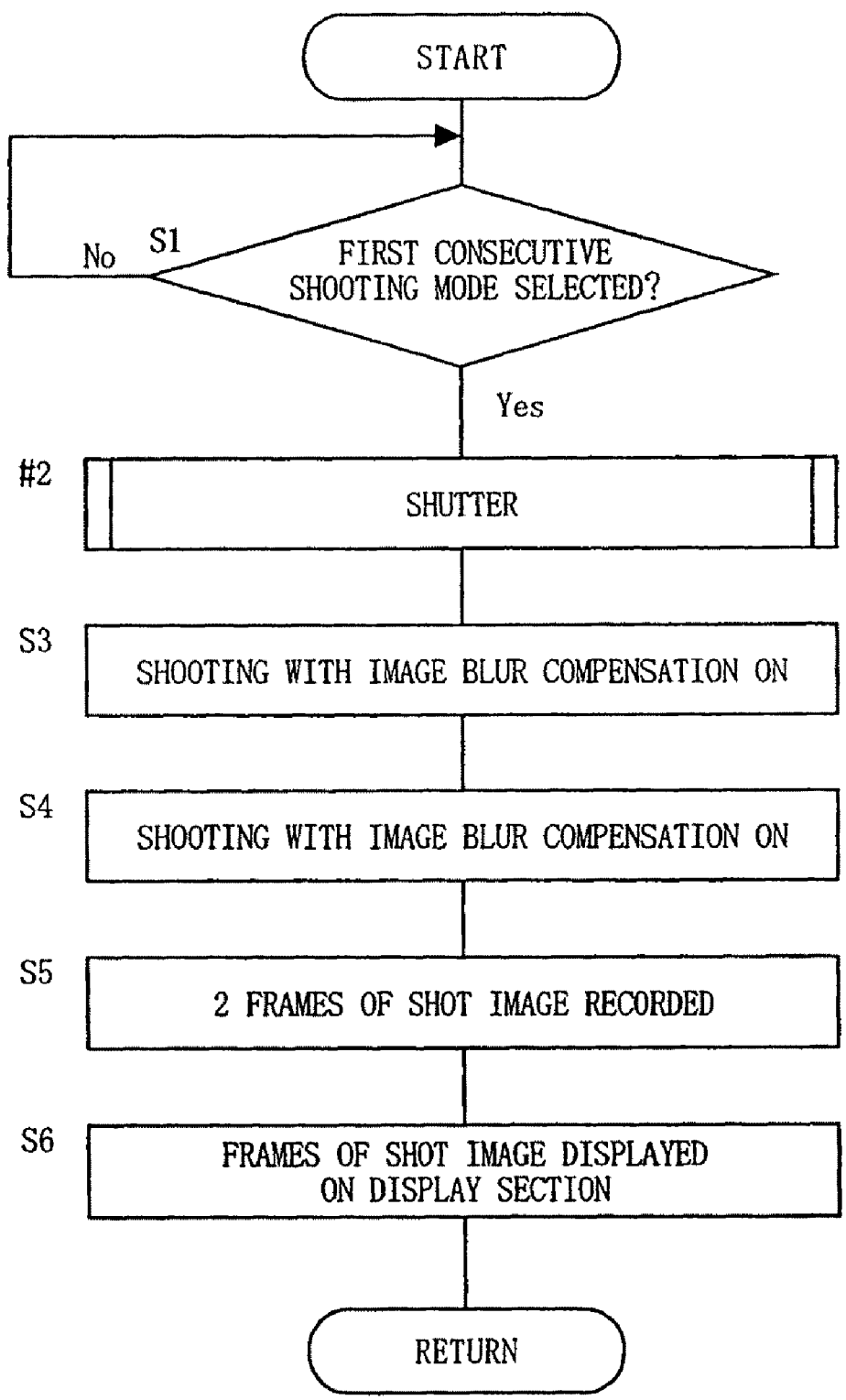
FIG. 4 is a flowchart showing shooting operations in a first consecutive shooting mode, which are performed by the digital camera shown in FIG. 1.

First, with reference to a flowchart shown in FIG. 4, an operation of shooting in a first consecutive shooting mode will be described.

At step S1, in order to set the first consecutive shooting mode, a shooter selects the first consecutive shooting mode from an operation menu displayed on the display section 55 by operating the menu setting section 39 provided on a rear surface of the housing C of the digital camera 1$a$ and makes a determination by means of the SET operation section 40.

At step #2, when the shutter operation section 36 is operated in a state where the strobe device 44 and the image blur compensation mechanism 20 are operational, the microcomputer 3 sends an instruction to the digital signal processing section 8. In response to the received instruction, the digital signal processing section 8 calculates an exposure value based on a received image signal. And the microcomputer 3 automatically sets an appropriate shutter speed using the exposure value and ends photometric processing.

At step S3, a focus motor which is not shown in the figure is driven so that a contrast value of the image signal reaches a peak, in-focus processing is performed, and range-finding processing is ended, whereby a first frame of an image is shot.

At step S4, shooting of a second frame of the image is followed under same conditions as those under which the first frame of the image is shot.

At step S5, an image shooting signals of the second frames of the image are recorded in the image recording section 12.

At step S6, the shooter operates the shooting/playback section 37 for switching to a playback mode and the cross operation key 38, whereby the shot image is selected and displayed on the display section 55.

In the image blur compensation mechanism 20 operated upon consecutively shooting 2 frames, when the angular sensors 18$x$ and 18$y$ detects hand jiggling caused on the digital camera 1$a$ upon shooting, the microcomputer 3 gives an instruction to offset the hand jiggling. And a current is supplied to the coils 24$x$ and 24$y$ on the pitching moving frame 21 from respective external circuits, whereby a magnetic circuit formed by the actuators 27$x$ and 27$y$ moves the pitching moving frame 21 in an XY plane perpendicular to the optical axis AX.

And a position of the pitching moving frame 21 is detected by a photo receiving element 29 with high precision. In other words, the L2 lens unit is moved by the image blur compensation mechanism 20 in the 2-axis plane perpendicular to the optical axis AX, whereby the image entering into the imaging sensor 4 via the imaging optical system L can be compensated, making it possible to shoot a good image with a blur suppressed.

The shot image recorded in the image recording section 12, if necessary, can be erased by operating the cross operation key 38.

As stated above, although in the present embodiment, the image blur compensation function is operated upon shooting in the first consecutive shooting mode, it is also possible to shoot without operating the image blur compensation function by operating the cross operation key 38. Further, shooting through forcing the strobe device 44 not to emit light by operating the strobe device on/off switching device may be selected. And the strobe device 44 may be operated so as not to emit light for shooting the first frame of the image and to emit light for shooting the second frame of the image.

<Second Consecutive Mode>

Figure 5:
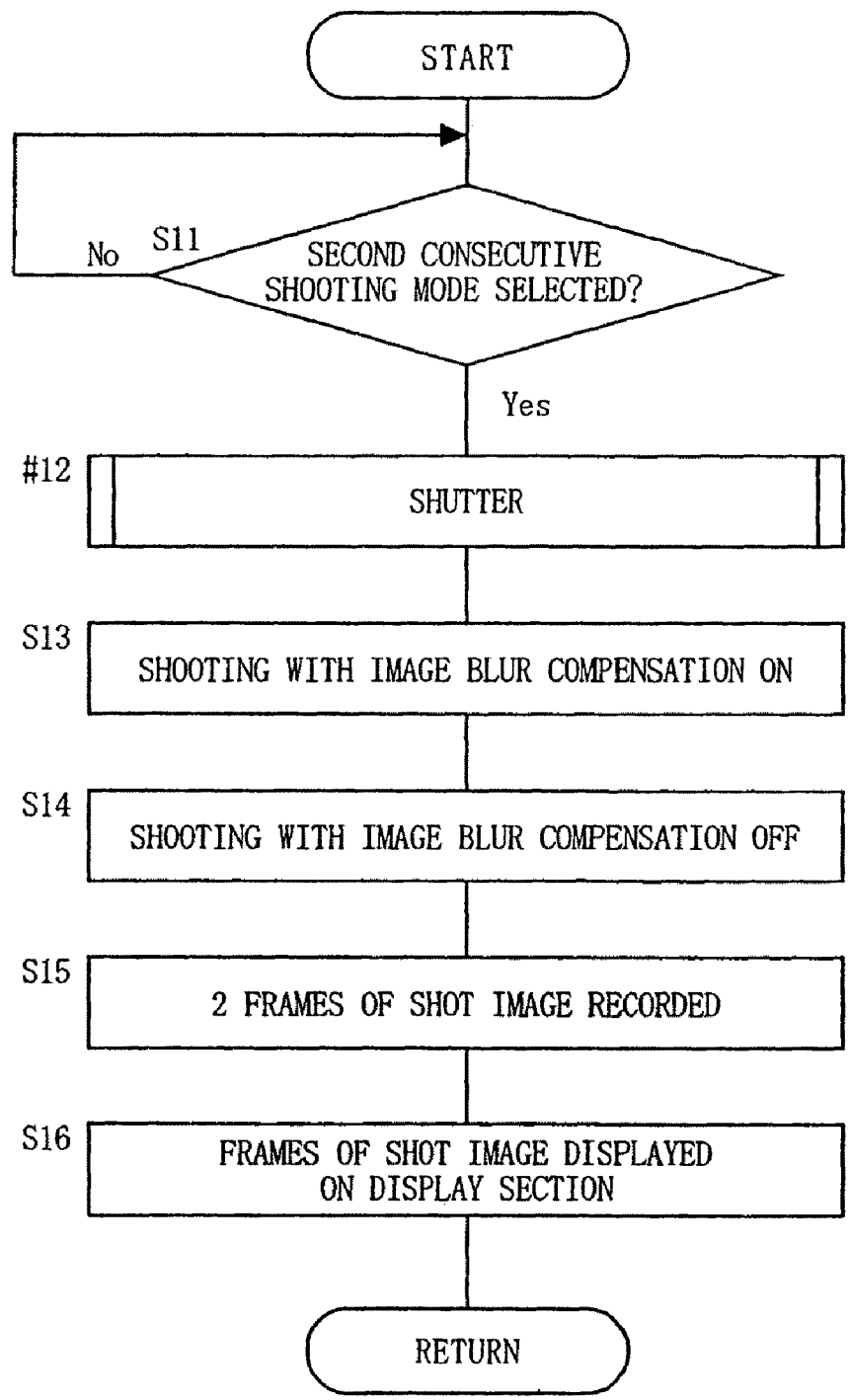
FIG. 5 is a flowchart showing shooting operations in a second consecutive shooting mode according to the first embodiment of the present invention.

Next, with reference to FIG. 5 and FIG. 6, shooting in a second consecutive mode will be described. As shown in a flowchart in FIG. 5, for shooting in the second consecutive mode, first at step S11, a shooter selects the second consecutive shooting mode from the operation menu displayed on the display section 55 by operating the menu setting section 39 provided on the rear surface of the housing C of the digital camera 1$a$ and makes a determination by means of the SET operation section 40.

As stated above, at step S11, the microcomputer 3, in a state where the second consecutive shooting mode is selected, the microcomputer 3 sends respective instructions for shooting a first frame of an image so as to cause the strobe device 44 to emit light irrespective of an operational state of the strobe device on/off switching section 56 and cause the image blur compensation mechanism 20 to operate irrespective of setting of an image blur compensation operation by the cross operation key 38. And the microcomputer 3 further sends instructions for shooting a second frame of the image so as to cause the strobe device 44 to emit light and the image blur compensation mechanism 20 not to operate.

At step #12, when a shooter operates the shutter operation section 36, the microcomputer 3 sends an instruction to the digital signal processing section 8. In response to the received instruction, the digital signal processing section 8 calculates an exposure value based on a received image signal. And the microcomputer 3 sets an appropriate shutter speed using the exposure value and ends photometric processing.

At step S13, a focus motor (not shown) is driven so that a contrast value of the image signal reaches a peak, in-focus processing is performed, and range-finding processing is ended. And a first frame of the image is shot. For shooting the first frame of the image, image blur compensation is performed. Specifically, hand jiggling on the digital camera 1a is detected by the angular velocity sensors 18x and 18y and the microcomputer 3 gives an instruction so as to offset the hand jiggling. And a current is supplied to the coils 24x and 24y on the pitching moving frame 21 from respective external circuits and the magnetic circuit formed by the actuators 27x and 27y moves the pitching moving frame 21 in the XY plane perpendicular to the optical axis AX.

And a position of the pitching moving frame 21 is detected by the photo receiving element 29 with high precision. In other words, the L2 lens unit is moved by the image blur compensation mechanism 20 in the 2-axis plane perpendicular to the optical axis AX, whereby the image entering into the imaging sensor 4 via the imaging optical system L can be compensated. Accordingly, for shooting in a state where the strobe device 44 is caused not to emit light, i.e., in a state where a shutter speed is, for example, 1/60s, it is made possible to shoot a good image with a blur suppressed.

At step S14, in a state where the strobe device 44 is caused to emit light and the image blur compensation mechanism 20 is caused not to operate, i.e., in a state where the L2 lens unit is electrically fixed in a center, a second frame of the image is shot. In this case, the shutter speed is set to be fast owing to light emission from the strobe device 44, for example, at 1/250s, if the shutter speed is set at 1/60s when the strobe device 44 is caused not to emit light.

At step S15, shooting signals of the 2 frames of the image shot in a consecutive manner are recorded in the image recording section 12 and a consecutive shooting operation is completed.

At step S16, the 2 frames of the shot image can be displayed on the display section 55 through same operations as those performed after the shooting in the first consecutive shooting mode. A display method in this case will be described hereinafter with reference to FIG. 6.

On a left side of FIG. 6, an image Ia is shown, which is a first frame shot when the strobe device 44 is caused not to emit light and the image blur compensation mechanism 20 is caused to operate and displayed on the display section 55. Similarly, on a right side of FIG. 6, an image Ib is shown, which is a second frame shot when the strobe device 44 is caused to emit light and the image blur compensation mechanism 20 is caused not to operate, and displayed on the display section 55.

As shown in the image Ia, aright arrow key is concurrently displayed at a right lower portion of the first frame of the image. And when a right arrow key of the cross operation key 38 is pressed, the second frame of the image, as shown in the image Ib, is displayed replacing the first frame of the image. This second frame of the image Ib is an image, as stated above, shot when the strobe device 44 is caused to emit light and the image blur compensation function performed by means of the image blur compensation mechanism 20 is cancelled. At a left lower portion of the second frame of the image, a left arrow key is concurrently displayed. When a left key of the cross operation key 38 is pressed, the first frame of the image Ia is displayed. In a normal operation, the 2 frames Ia and Ib of the image are recorded in the image recording section 12. And it is also possible to erase a displayed image by pressing a lower arrow key of the cross operation key 38 in a state where each frame of the image is selected.

As stated above, when shooting in the second consecutive shooting mode, the imaging device having the image blur compensation mechanism enables shooting, through one shutter operation using the shutter operation section 36, an image by operating the image blur compensation function and an image by not operating the image blur compensation function. Therefore, a common object is consecutively shot under substantially unchanged conditions except conditions regarding the image blur compensation function and other related functions. In other words, first shooting (with the image blur compensation) under natural lighting conditions and second shooting (without the image blur compensation) in which the shutter speed is increased by causing the strobe device to emit light are automatically performed. As a result, effect of enhancing freedom and enjoyment, which is achieved through selecting a favorite one from the 2 consecutively shot frames of the image, can be obtained.

In the second consecutive shooting, in a reversed manner, a first frame of the image may be shot with the strobe device 44 caused to emit light and with the image blur compensation function caused not to operate and a second frame of the image may be shot with the strobe device 44 caused not to emit light and with the image blur compensation mechanism 20 caused to operate.

<Third Consecutive Shooting Mode>

Figure 7:
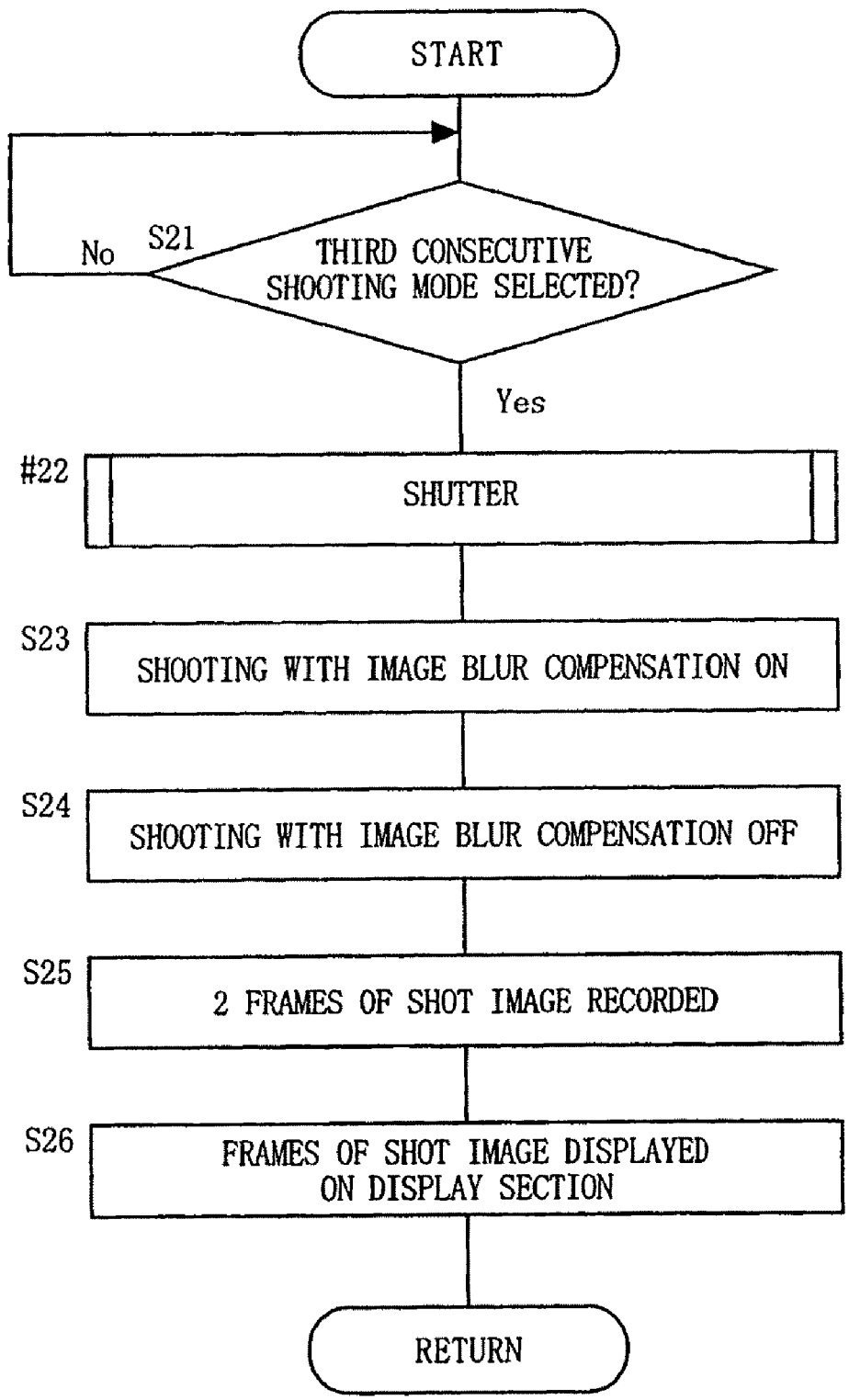
FIG. 7 is a flowchart showing shooting operations in a third consecutive shooting mode according to the first embodiment of the present invention.

Next, with reference to FIG. 7, FIG. 8, and FIG. 9, shooting in a third consecutive shooting mode will be described. As shown in a flowchart in FIG. 7, in order to shoot in the third consecutive mode, first at step S21, a shooter selects the third consecutive shooting mode from the operation menu displayed on the display section 55 by operating the menu setting section 39 provided on the rear surface of the housing C of the digital camera 1a and makes a determination by means of the SET operation section 40.

In the third consecutive shooting mode, the microcomputer 3 causes the strobe device 44 not to emit light for shooting both 2 frames of an image irrespective of an operational state of the strobe device on/off switching section 56. And irrespective of setting for an image compensation operation using the cross operation key 38, the microcomputer 3 causes the image blur compensation mechanism 20 to operate for shooting a first frame of the image and not to operate for shooting a second frame of the image.

And through a setting operation for shooting in the third consecutive shooting mode, the microcomputer 3 sends an instruction to the imaging optical system L and thereby causes the imaging lens unit 2 to be automatically positioned at a telephoto limit.

At step S22, in the third consecutive shooting mode to be set as stated above, when the shutter operation section 36 is operated, the microcomputer 3 sends an instruction to the digital signal processing section 8. In response to the received instruction, the digital processing section 8 calculates an exposure value based on an received image signal. And the microcomputer 3 sets an appropriate shutter speed by using the exposure value and photometric processing is ended.

At step S23, a focus motor is driven so that a contrast value of the image signal reaches a peak, in-focus processing is performed, range-finding processing is ended, and a first frame of the image is shot. For shooting the first frame of the image, hand jiggling on the digital camera 1a is detected by the angular velocity sensors 18x and 18y and the microcomputer 3 gives an instruction so as to offset the hand jiggling. And a current is supplied to the coils 24x and 24y on the pitching moving frame 21 from respective external circuits and the magnetic circuit formed by the actuators 27x and 27y moves the pitching moving frame 21 in the XY plane perpendicular to the optical axis AX.

And a position of the pitching moving frame 21 is detected by the photo receiving element 29 with high precision. In other words, the L2 lens unit is moved by the image blur compensation mechanism 20 in the 2-axis plane perpendicular to the optical axis AX, whereby the image entering into the imaging sensor 4 via the imaging optical system L can be compensated. Accordingly, for shooting in a state where the strobe device 44 is caused not to emit light, i.e., in a state where a shutter speed is, for example, 1/60s, it is made possible to shoot a good image with a blur suppressed.

At step S24, in a state where the image blur compensation mechanism 20 is caused not to operate i.e., in a state where the L2 lens unit is electrically fixed in a center, and the strobe device 44 is caused not to emit light, a second frame of the image is shot.

For shooting both the first and the second frames of the image in the third consecutive shooting mode, because the strobe device 44 is caused not to emit light, a shutter speed is set to be slow, for example, at 1/60s, as compared with a case where the strobe device 44 is caused to emit light. However, even when such a slow shutter speed is set, because the first frame of the image is shot in a state where the image blur compensation mechanism 20 is caused to operate, little or no deterioration in image quality arises. On the other hand, since the second frame of the image is shot in a state where the image blur compensation mechanism 20 is caused not to operate, deterioration in image quality is most likely to arise.

At step S25, the 2 frames of the image, which have been shot in the above-mentioned manner, are recorded in the image recording section 12 and an consecutive shooting operation is ended.

At step S26, when a playback mode is set by operating the shooting/playback switching section 37, in response to an instruction from the microcomputer 3, the 2 images are automatically displayed right and left on the display section 55.

Figure 8:
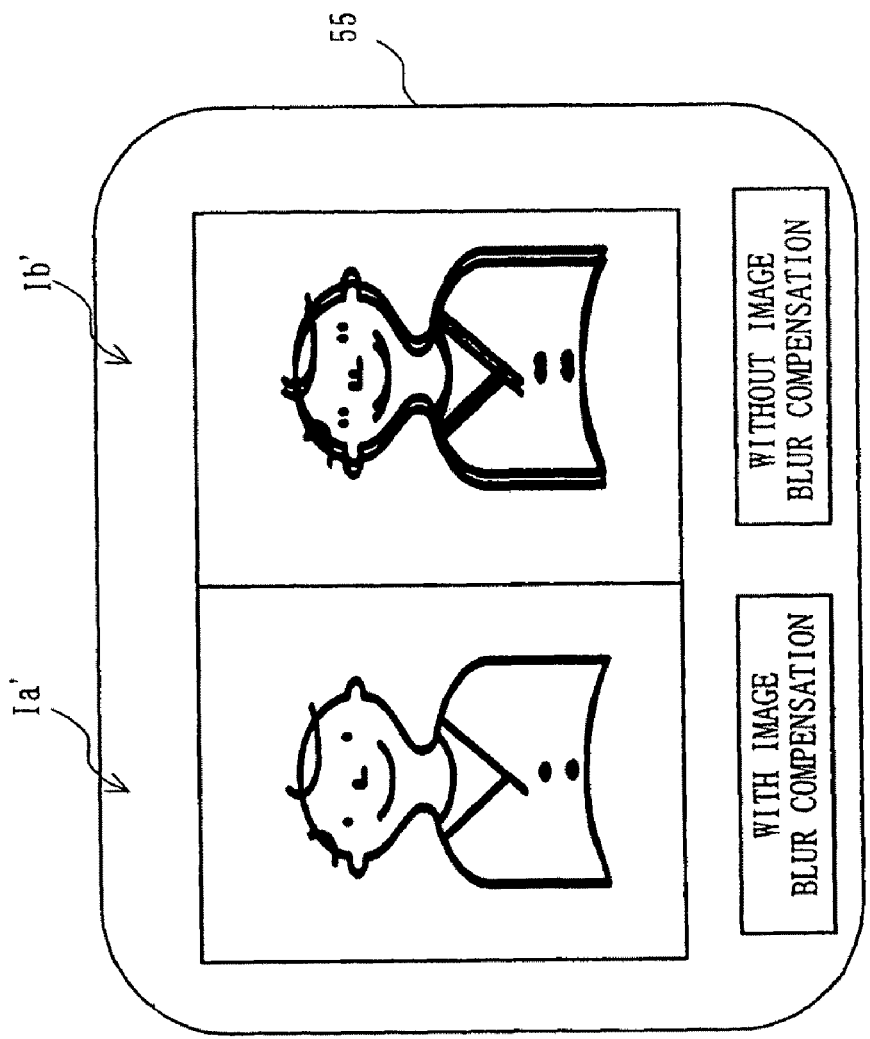
FIG. 8 is a diagram illustrating frames, displayed on a display section, of an image shot in the third consecutive shooting mode according to the first embodiment of the present invention.

In FIG. 8, 2 shot images displayed on the display section 55 are exemplified. On a left side of FIG. 8, a first image Ia' shot when the image blur compensation mechanism 20 is operated is shown and on a right side of FIG. 8, a second image Ib' shot when the image blur compensation mechanism 20 is not operated is shown. By comparing the shot images Ia' and Ib', a shooter can recognize that the second shot image Ib' is inferior in quality to the first shot image Ia'.

In this example, as stated above, because the 2 frames of the image are shot when the strobe device 44 is forced not to emit light, when shooting at a slow shutter speed, quality deterioration of the image ia' shot when the image blur compensation mechanism 20 is operated is apparent as compared with the image Ib' shot when the image blur compensation mechanism 20 is not operated. As a result, a great difference between both the shot images appears, thereby exhibiting effect of extremely easy comparison and reviewing.

Figure 9:
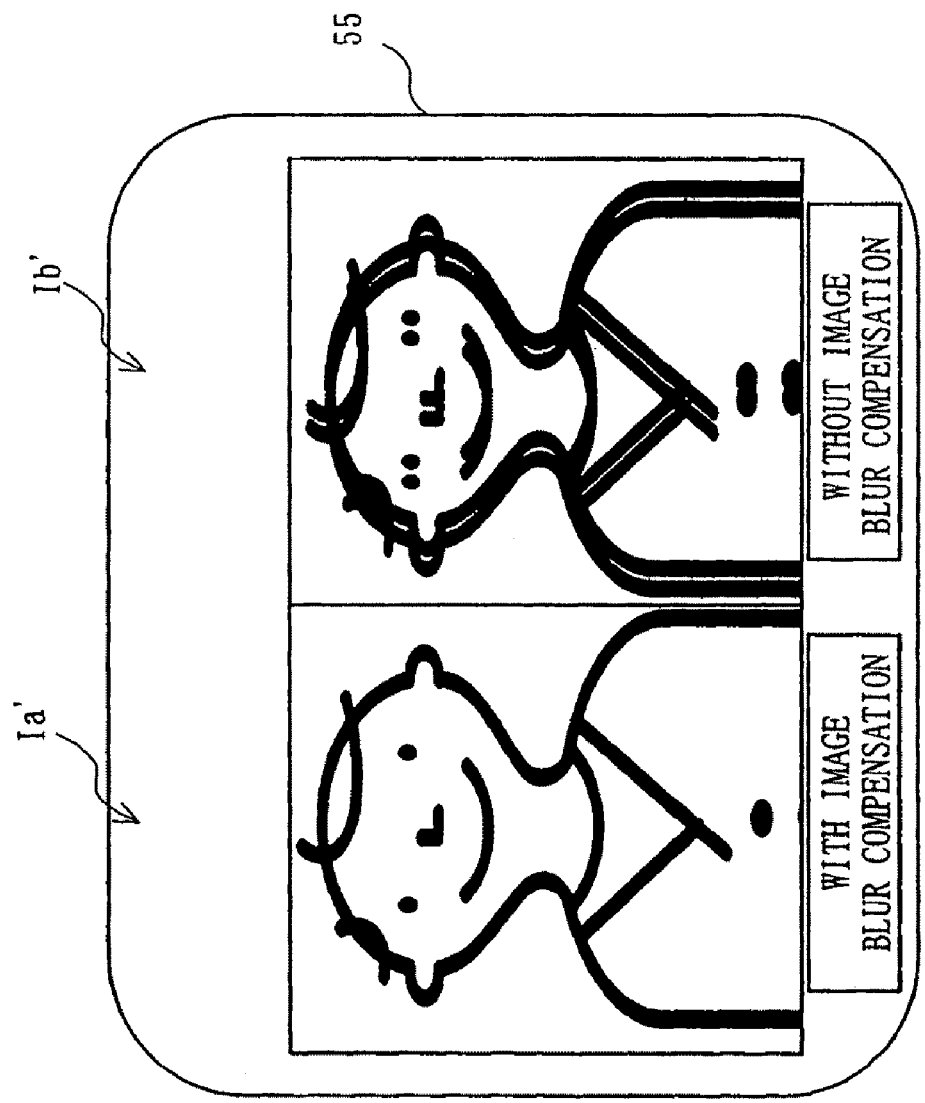
FIG. 9 shows an view, enlarged and displayed on the display section, of the frames of the shot image in the third consecutive shooting mode.

In a state where the 2 frames Ia' and Ib' of the shot image are displayed side by side on the display section 55 as shown in FIG. 8, for example, by rotating the zoom operation section 57 clockwise, in response to an instruction from the microcomputer 3, the shot images Ia' and Ib' are enlarged and displayed as shown in FIG. 9. Although the zoom operation section 57 is used normally for zooming an image upon shooting by driving the imaging optical system L, the zoom operation section 57, in this embodiment, is used for zooming shot images displayed on the display section 55. In other words, when shot images are displayed on the display section 55, a user's operation on the zoom operation section 57 is transmitted to an image signal output control section 45, whereby a displayed image is zoomed.

Owing to an enlarged display stated above, comparison of quality can be made between the shot images Ia' and Ib' in a clearly visible manner, allowing even an elderly shooter to easily make a comparison.

If necessary, the consecutively shot 2 frames Ia' and Ib' of the image can be erased from the image recording section 12 in response to an instruction from the microcomputer 3 by operating the cross operation key 38.

As stated above, in the third consecutive shooting mode, a general camera user (shooter) can make a comparison on the spot between an image in which quality deterioration is reduced by operating the image blur compensation mechanism and an image in which quality deterioration is caused due to the hand jiggling which is caused by not operating the image blur compensation mechanism upon shooting. As a result, a shooter can easily practice shooting through repetition of consecutive shooting, making a comparison, erasing or the like so as to be able to shoot an image having quality deterioration reduced even when the image blur compensation mechanism is not operated. As stated above, the imaging device according to the present invention is remarkably convenient, enabling a shooter to easily acquire a shooting technique.

As stated above, in the third consecutive shooting mode, since a prospective purchaser of a digital camera can see effect of the image blur compensation mechanism on actual shot images, it is extremely convenient. In other words, at a shop or the like, a prospective purchaser consecutively shoots images in the third consecutive shooting mode and look at images, for making a comparison, displayed side by side on the display section, thereby seeing the effect of the image blur compensation mechanism on the spot. In addition, the digital camera can be used for a demonstration in which a shop clerk demonstrates the effect of the image blur compensation to a prospective purchaser using images shot on the spot for a comparison and also in this respect, is convenient.

And in the third consecutive shooting mode, in response to an instruction of the microcomputer 3, the imaging lens unit of the imaging optical system L is automatically positioned at the telephoto limit for shooting, whereby image quality deterioration caused by the hand jiggling upon shooting appears in an apparent manner and the effect of the image blur compensation mechanism also appears in an apparent manner. Therefore, it is easy to see in a favorable manner the difference between the 2 frames of the shot image, when compared. Of course, needless to say, even if the imaging lens unit of the imaging optical system L may be positioned at an arbitrary imaging optical position, not the telephoto limit, for shooting, a similar effect can be obtained.

And in the third consecutive shooting rode, shooting may be performed with the image blur compensation mechanism 20 caused not to operate for the first frame of the image and with the image blur compensation mechanism 20 caused to operate for the second frame of the image. In this case, the strobe device 44 may be caused to emit light for shooting both the first and the second frames of the image, or may be caused to emit light for shooting either one of the first and the second frames of the image.

Although with reference to FIG. 9, the example in which the 2 frames Ia' and Ib' of the shot image are displayed right and left is described, a display method is not limited to this and the 2 frames Ia' and Ib' of the shot image may be displayed with one above the other.

And an image shot when the image blur compensation mechanism 20 is operated and an image shot when the image blur compensation mechanism 20 is not operated may be displayed in an order opposite to the above-mentioned order.

Further, a method for displaying the 2 frames Ia' and Ib' of the shot image is not limited to the above-mentioned method and a display may be switched from one of the 2 frames Ia' and Ib' of the shot image to the other of the 2 frames Ia' and Ib' of the shot image.

If it is desired that the third consecutive shooting mode is utilized only for the demonstration, it is possible for only a shop clerk at an outlet store to make settings. Specifically, the third consecutive shooting mode may be set by operating the power switch 35 while concurrently operating the shutter operation section 36 and the menu setting section 39 and by turning on a power source of the digital camera 1a.

And the 2 frames of the shot image may be recorded, for example, in a buffer memory 9, instead of the image recording section 12, to be displayed on the display section 55. Further, erasure of the shot images may be performed by other operational sections, instead of the cross operation section key.

<Fourth Consecutive Shooting Mode>

Figure 10:
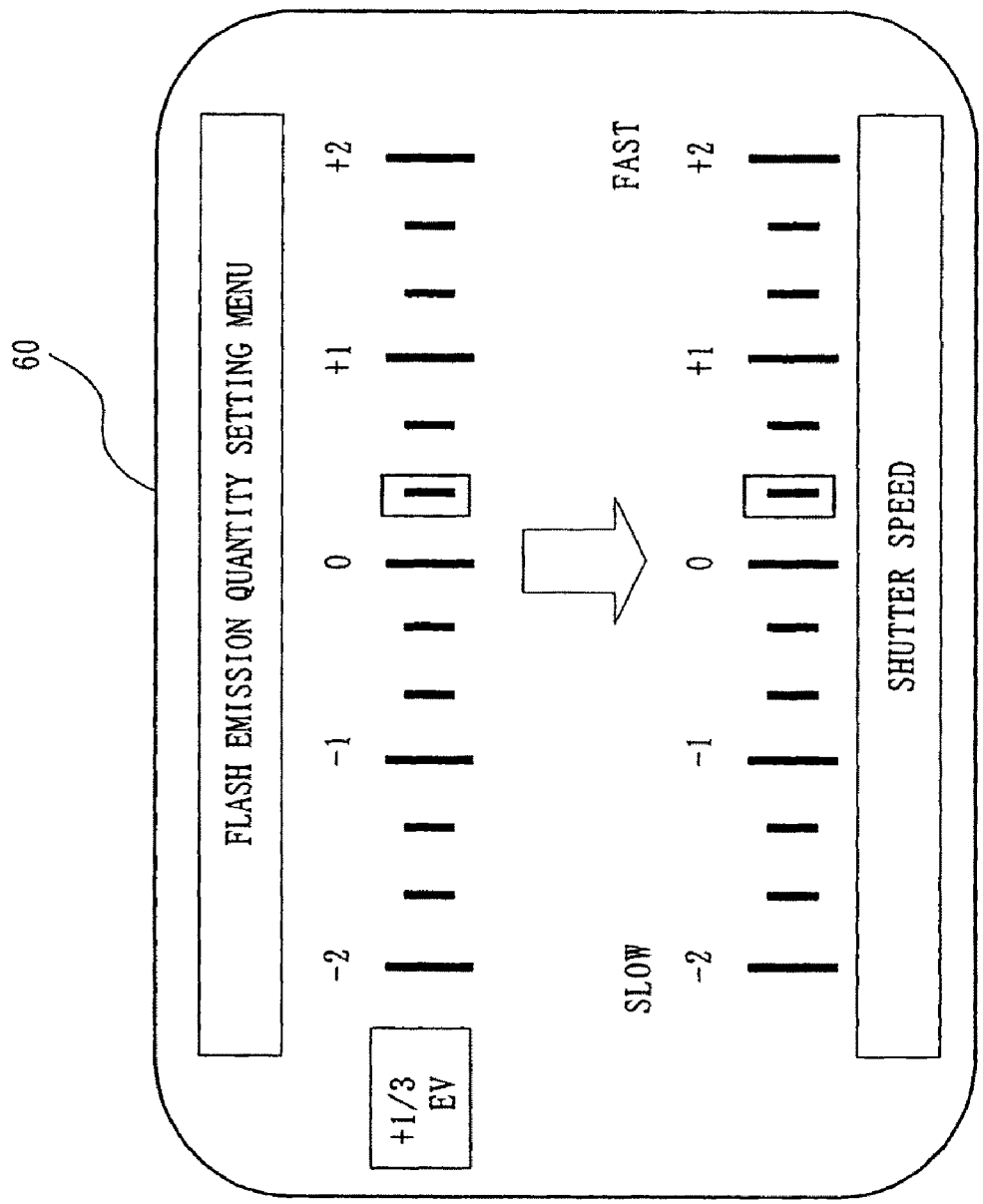
FIG. 10 is a schematic diagram illustrating a flash emission quantity adjusting menu in a fourth consecutive shooting mode according to the first embodiment of the present invention.
Figure 11:
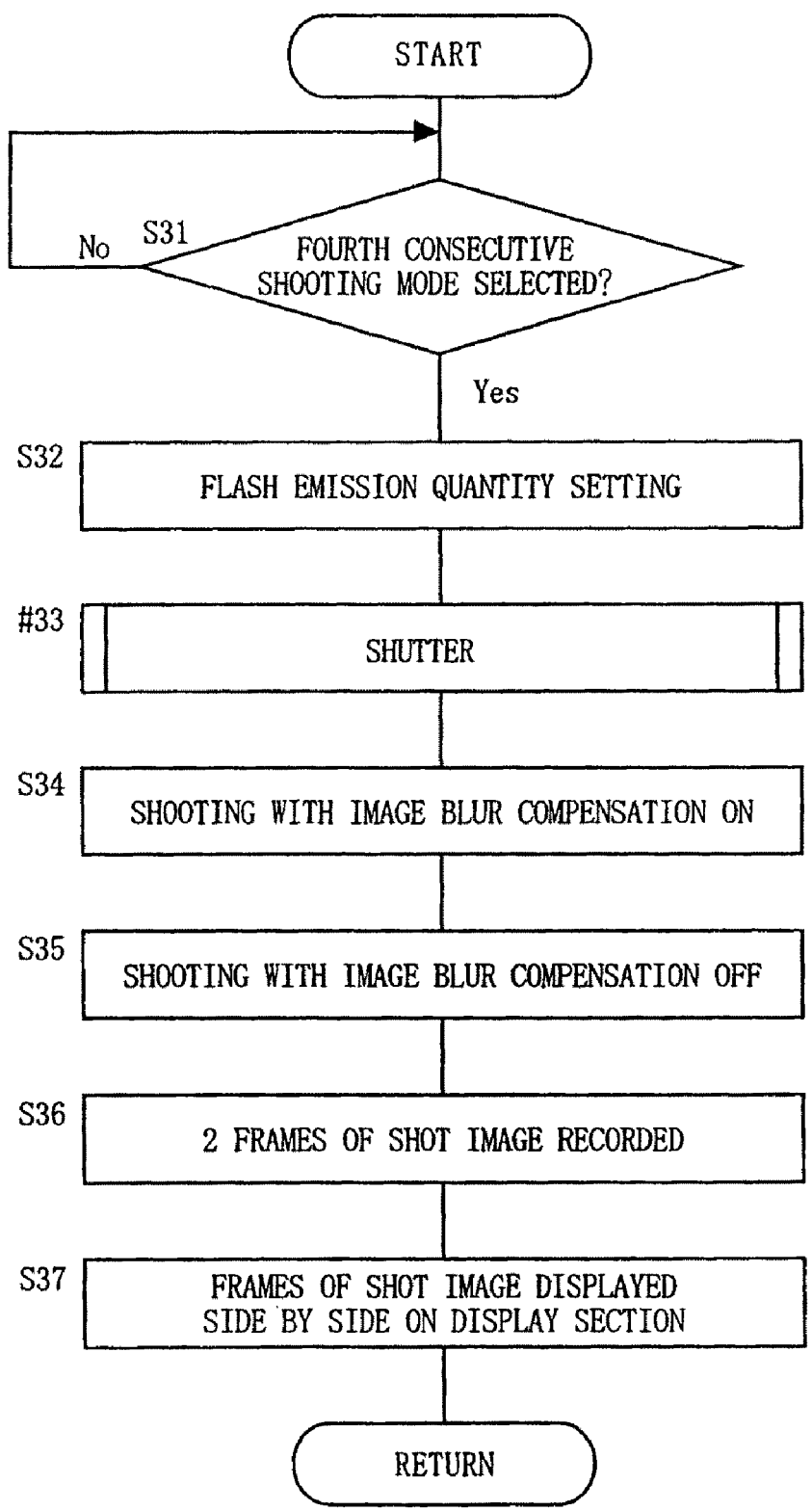
FIG. 11 is a flowchart showing shooting operations in the fourth consecutive shooting.

Next, with reference to a flash emission quantity adjustment menu shown in FIG. 10 and a flowchart shown in FIG. 11, a fourth consecutive shooting mode will be described.

At step S31, a shooter selects the fourth consecutive shooting mode from the operation menu displayed on the display section 55 by operating the menu setting section 39 provided on the rear surface of the housing C of the digital camera 1a and further makes a determination for the selection by means of the SET operation section 40. In a state where the fourth consecutive shooting mode has been selected, the microcomputer 3 is set so as to perform control as below described. For shooting a first frame of an image, the microcomputer 3 causes the strobe device 44 not to emit light irrespective of an operational state of the strobe device on/off switching section 56. Further, the microcomputer 3 causes the image blur compensation mechanism 20 to operate irrespective of setting for an image blur compensation operation which is performed by means of the cross operation key 38. And for shooting a second frame of the image, the microcomputer 3 causes the strobe device 44 to emit light and the image blur compensation mechanism 20 not to operate.

At step S32, a shooter sets an emission quantity of the strobe device 44 on the flash emission quantity setting menu 60 (FIG. 10) by operating the cross operation key 38. The flash emission quantity is adjustable per ⅓EV step in a range from −2EV to +2EV. A shutter speed is controlled in accordance with a change in the emission quantity of the strobe device. In other words, in order to maintain a constant exposure, the shutter speed is controlled so that when the emission quantity of the strobe device becomes larger, the shutter speed becomes faster and when the emission quantity of the strobe device becomes smaller, the shutter speed becomes slower.

At step S33, in the fourth consecutive shooting mode, which has been set in an above-mentioned manner, when the shutter operation section 36 is operated, the microcomputer 3 sends an instruction to the digital signal processing section 8. In response to the received instruction, the digital signal processing section 8 calculates an exposure value based on a received image signal. And by using the exposure value, the microcomputer 3 sets an appropriate shutter speed and photometric processing is ended. Further, a focus motor (not shown) is driven so that a contrast value of the image signal reaches a peak, in-focus processing is performed, and range-finding processing is ended.

At step S34, a first frame of an image is shot. Specifically, when the angular sensors 18x and 18y detect hand jiggling caused on the digital camera 1a, the microcomputer 3 gives an instruction to offset the hand jiggling. And when a current is supplied to the coils 24x and 24y of the pitching moving frame 21 from respective external circuits, the magnetic circuit formed by the actuators 27x and 27y moves the pitching moving frame 21 in the XY plane perpendicular to the optical axis AX.

And a position of the pitching moving frame 21 is detected by the photo receiving element 29 with high precision. In other words, the L2 lens unit is moved by the image blur compensation mechanism 20 in the 2-axis plane perpendicular to the optical axis AX, whereby the image entering into the imaging sensor 4 via the imaging the optical system L can be compensated, making it possible to shoot a good image with a blur suppressed, for example, even if the shutter speed is ⅟₆₀s.

At step S35, a second frame of the image is shot. Specifically, in a state where the strobe device 44 is caused to emit light and the image blur compensation mechanism 20 is caused not to operate, i.e., in a state where the L2 lens unit is electrically fixed in a center, the second frame of the image is shot. In this case, the shutter speed is set to be fast owing to light emission from the strobe device 44, for example, at ⅟₂₅₀s, if the shutter speed is set at ⅟₆₀s when the strobe device 44 is caused not to emit light. And a shooter can set an emission quantity of the strobe device in a discretionary manner by using the flash emission quantity setting menu 60.

At step S36, 2 frames consecutively shot of the image at the above-mentioned steps S34 and S35 are recorded in the image recording section 12. And a consecutive shooting operation is completed.

At step S37, the 2 frames of the image, which have been recorded in the image recording section 12, are displayed on the display section 55 through same operations as those performed after the shooting in the second or the third consecutive shooting mode.

As stated above, when shooting in the fourth consecutive shooting mode, the imaging device having the image blur compensation mechanism enables, through one shutter operation using the shutter operation section 36, shooting an image by operating the image blur compensation function and an image by not operating the image blur compensation function. As a result, a common object is consecutively shot under unchanged conditions except conditions regarding availability of the image blur compensation, an emission quantity of the strobe device, and a shutter speed.

In other words, since first shooting under natural lighting conditions (shooting environment conditions) and second shooting in which the shutter speed is increased by causing the strobe device to emit light are automatically performed, effect of enhancing freedom and enjoyment, which is achieved through selecting a favorite one from the 2 frames consecutively shot of the image, can be obtained. Furthermore, since the emission quantity of the strobe device is adjustable, shooting under many conditions is made possible, further enhancing freedom in shooting.

In the fourth consecutive shooting mode, a shooting method other than the above-mentioned shooting method may be employed. In other words, a first frame of an image is shot with the strobe device 44 caused to emit light and with the image blur compensation function caused not to operate. And a second frame of the image is shot with the strobe device 44 caused not to emit light and with the image blur compensation mechanism 20 caused to operate. And even when the image blur compensation function is operating, the strobe device may be caused to emit light with the emission quantity decreased. Further, a diaphragm stop, instead of the shutter speed, may be altered in accordance with the emission quantity of the strobe device.

Although a strobe device in which a xenon discharge tube is caused to emit light is utilized in general, a light emitting diode (LED) in which power consumption is low and an emission quantity is easily controlled may be utilized as a strobe device. Although a luminance level of an LED now in practical use is still low as compared with that of the xenon discharge tube, the LED can be made usable as a strobe device when a small emission quantity thereof is supplemented by operating the image blur compensation. And shooting may be performed while altering an exposure through altering sensitivity of the imaging sensor 4, instead of adjusting the emission quantity of the strobe device.

Further, a selection and a determination of operations of the digital camera, which are made by operating the menu setting section 39, may be performed by an operation such as pressing on the menu setting section 39 itself.

A configuration of the imaging optical system L and the image blur compensation mechanism 20 is not limited to the configuration described above. In particular, the image blur compensation mechanism is not limited to an inner shift type in which the lens unit is driven in a direction perpendicular to the optical axis AX. Other methods for enabling the image blur compensation may be employed, such as a method in which the imaging sensor 4 is driven in 2 directions perpendicular to the optical axis AX of the imaging optical system L, a method in which an angle of a prism mounted on a frond surface of a lens barrel is altered, and a method in which an entire lens barrel is driven. And a electronic compensation method in which an image clipping position within the imaging sensor is altered may be adopted. Itis clearly understood that a compensation method is not limited. For a digital camera in which the image blur compensation is performed without driving the lens unit as described above, lens units used in the conventional single-lens reflex optical camera may be utilized.

As the present embodiment, the digital camera in which a selection from the 4 consecutive shooting modes can be made is described. However, in the digital camera, only 1 or 2 of the four consecutive shooting modes may be selectable, further 4 or more consecutive shooting modes may be selectable, or 1 or 2 of the four consecutive shooting modes as well as other consecutive shooting modes may be selectable.

Second Embodiment

Hereinafter, with reference to FIG. 12 and FIG. 13, an imaging device according to a second embodiment of the present invention will be described. In the imaging device according to the present embodiment, a shot image is displayed on an external display device through outputting a shot image signal from the digital camera 1a described above. In a configuration of the digital camera 1b according to the present embodiment, an image signal output control section 45 and an image signal output section 46 are included in addition to components of the digital camera 1a. Therefore, if not particularly necessary, in order to avoid redundancy of descriptions, descriptions on sections and functions common to those of the digital camera 1a will be omitted. For similar reasons, only a microcomputer 3, an image control recording section 11, an image recording section 12, an image signal output control section 45, and an image signal output section 46, among components of the digital camera 1b are shown in FIG. 12.

Figure 12:
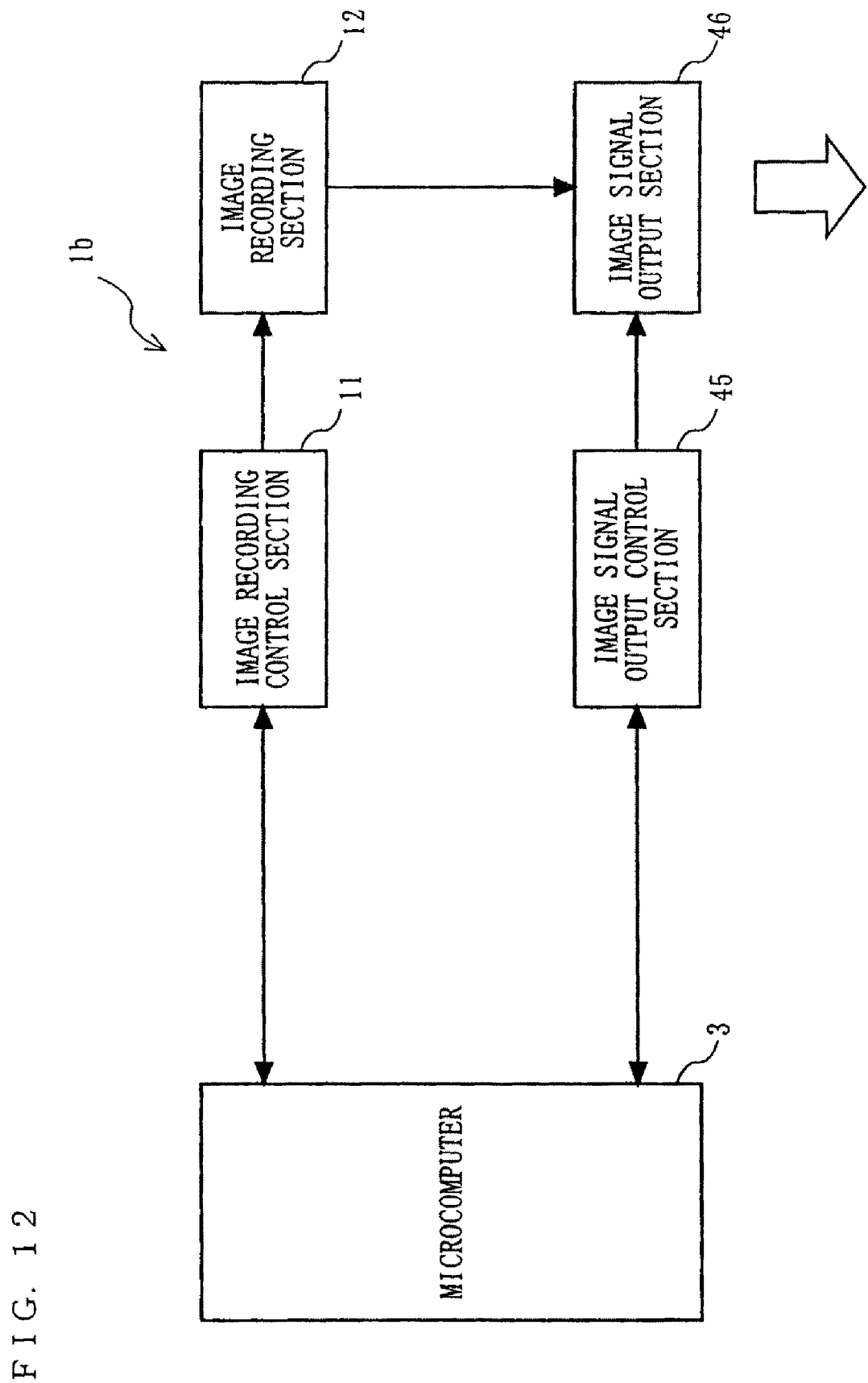
FIG. 12 is a block diagram illustrating an image signal control section of a digital camera according to a second embodiment of the present invention.

As shown in FIG. 12, a shot image recorded in the image recording section 12 in the digital camera 1b is outputted outside, via the image signal output section 46, controlled by the image signal output control section 45 which has received an instruction from the microcomputer 3.

Figure 13:
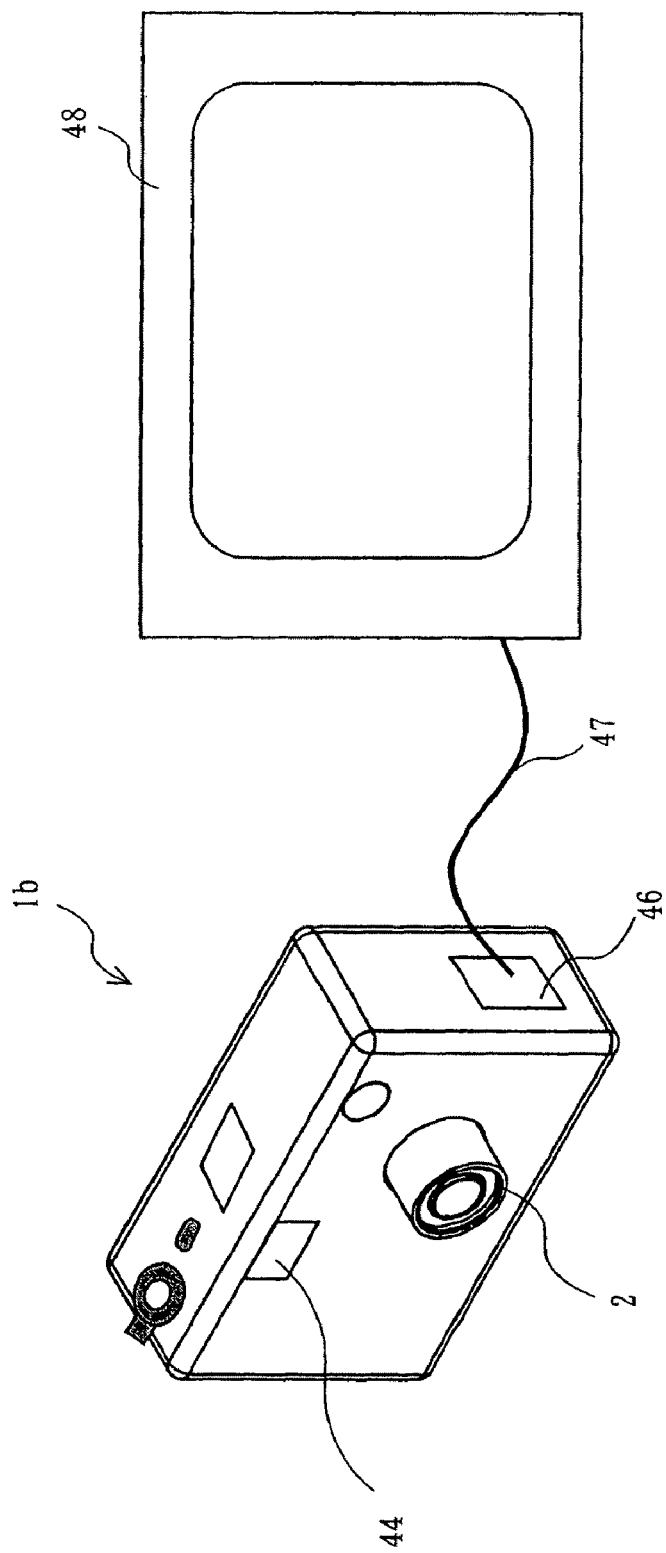
FIG. 13 is a diagram illustrating the digital camera, which is connected to a display device, according to the second embodiment of the present invention.

Specifically, as shown in FIG. 13, an external display device 48 is connected via an A/V cable 47 to the image signal output section 46 such as a television receiver, whereby an image shot by the digital camera 1b can be displayed on the display device 48 in the digital camera 1b. In a state where the A/V cable 47 is connected to the image output section 46, when shooting is performed, for example, in the third consecutive shooting mode and the shooting/playback switching section 37 is set to a playback mode, a shot image signal is outputted to the display device 48 and 2 frames of the shot image can be concurrently displayed on the display device 48 in an enlarged manner, as already described with reference to FIG. 8 or FIG. 9.

In the present embodiment, the signals of the consecutively shot image are outputted and a comparison between the 2 frames of the shot image can be made by means of a large screen of the display device. Therefore, a shooter can practice shooting while looking at the shot images displayed in the enlarged manner on the large screen. Further, it can be demonstrated that quality of the image which is shot while operating the image blur compensation mechanism does not deteriorate due to hand jiggling. The display device 48 for displaying the shot image is not limited to the television receiver. And the digital camera 1b may be connected to a personal computer via a USB connection cable, instead of the A/V cable, so that the shot image can be displayed on a display of the personal computer.

Third Embodiment

Hereinafter, with reference to FIG. 14 and FIG. 15, an imaging device according to a third embodiment of the present invention will be described. In the imaging device according to the present embodiment, a shot image can be printed by means of an external printer through outputting a shot image signal from the digital camera 1a described above. Accordingly, in a configuration of the digital camera 1c according to the present embodiment, an image printing control section 49 and a printing data output section 50 are included in addition to components of the digital camera 1a. Therefore, if not particularly necessary, in order to avoid redundancy of descriptions, descriptions on sections and functions common to those of the digital camera 1a will be omitted. For similar reasons, only a microcomputer 3, an image control recording section 11, an image recording section 12, an image printing control section 49, and a printing data output section 50, among components of the digital camera 1c are shown in FIG. 14.

Figure 14:
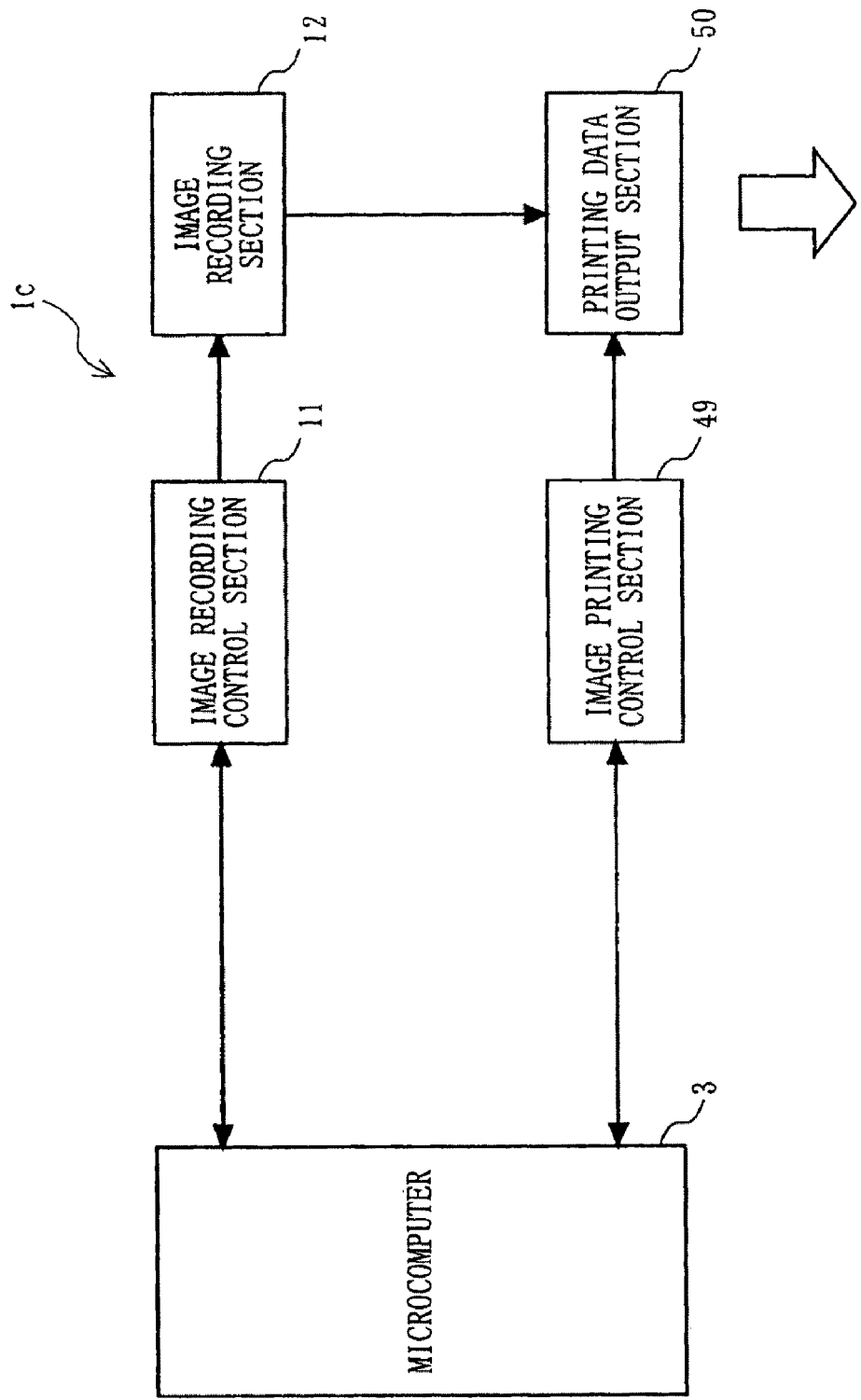
FIG. 14 is a block diagram illustrating an image printing control section of a digital camera according to a third embodiment of the present invention.

As shown in FIG. 14, a shot image recorded in the image recording section 12 of the digital camera 1c is outputted outside, via the printing data output section 50, controlled by the image printing control section 49 which has received an instruction from the microcomputer 3.

Figure 15:
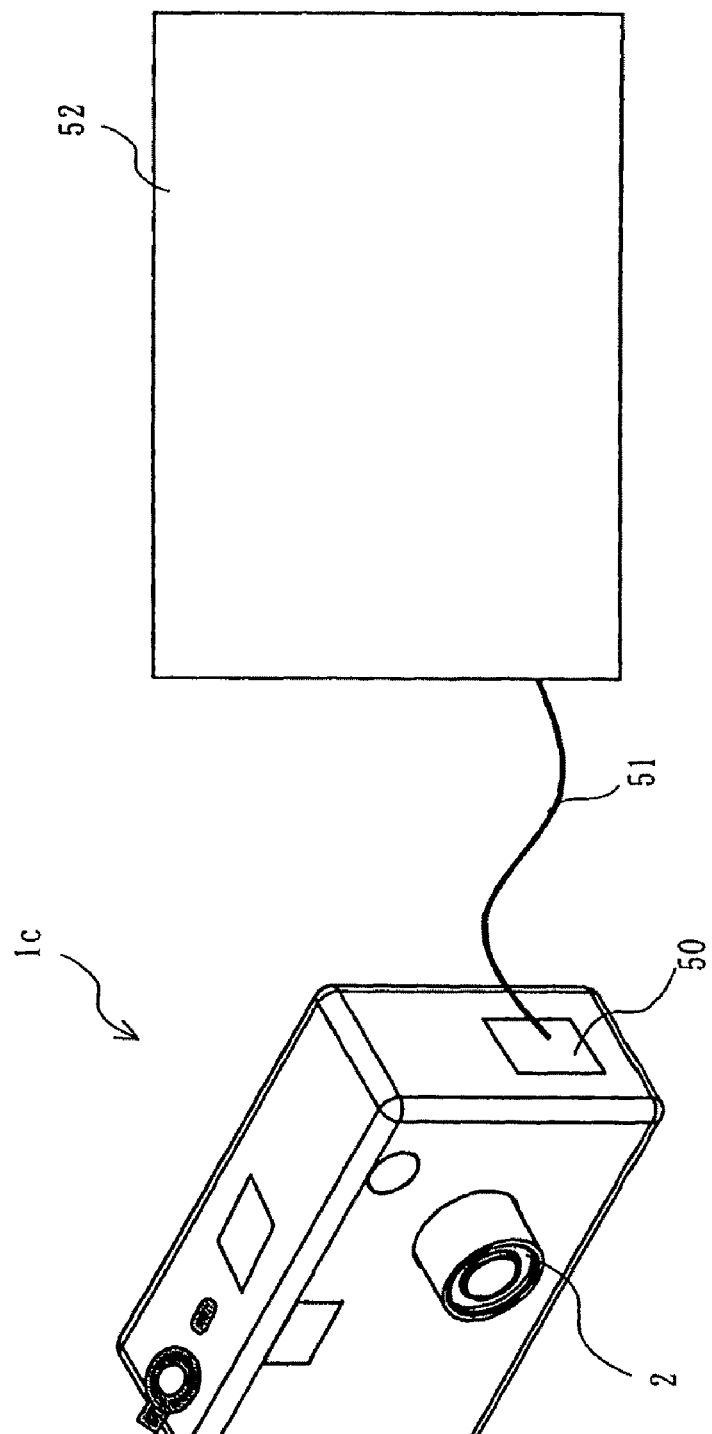
FIG. 15 is a diagram illustrating the digital camera, which is connected to a printer, according to the third embodiment of the present invention.

As shown in FIG. 15, an external printer 52 is connected via a USB connection cable 51 to the printing data output section 50 such as an ink-jet printer. As a result, a shot image recorded in the digital camera 1c can be printed by means of the printer 52.

In a state where the digital camera 1c is connected via the USB connection cable 51 to the printer 52, when a menu setting section 39 is operated and a printing command on a printing mode menu is executed, in response to an instruction from the microcomputer 3, shot image data is outputted to the printer 52. As a result, the shot image described with reference to FIG. 8 and FIG. 9 can be printed on a sheet of paper.

In the present embodiment, a shot image signal is outputted to the printer and a comparison between 2 printed frames of the consecutively shot image can be made. Therefore, a shooter can practice shooting while looking at the printed frames of the shot images. In addition, it can be checked with the sheet in hand that quality of the image which is shot while operating the image blur compensation mechanism 20 does not deteriorate due to hand jiggling. The printer 52 may be incorporated into the digital camera 1c.

Although in the above description, a case where the 2 frames of the image are consecutively shot is exemplified, a number of frames is not limited to 2 and the imaging device may shoot 3 or more frames of the image through one shutter operation. When a plurality of frames of the image are shot using a strobe device, the imaging device may have a so-called bracket shooting function with which an emission quantity of the strobe device is altered. Although the example in which the plurality of frames of the image are consecutively shot through one shutter operation is described, a system in which shooting can be performed only while operating (pressing) the shutter operation section may be employed.

Further, needless to say, the imaging device according to each embodiment of the present invention may be utilized as a digital camera incorporated into a mobile phone and an apparatus such as a PDA.

INDUSTRIAL APPLICABILITY

The present invention can be utilized as an imaging device such as a digital camera having an image blur compensation mechanism and in a mobile phone and a personal digital assistant.

The invention claimed is:

1. An imaging device configured to shoot in a consecutive shooting mode in which a plurality of images are consecutively shot through one operation of a shutter operation section, and shot image signals are generated, the imaging device comprising:
an image blur compensation unit for compensating a blur of an image;
a flash generation unit; and
a controller configured to control consecutive performances of a first shooting in a state prohibiting the flash generation unit from generating the flash and allowing the compensation unit to compensate a blur of an image, and a second shooting in a state allowing the flash generation unit to generate the flash and allowing the compensation unit to compensate a blur of an image, in order, after only one operation of the shutter operation section when the consecutive shooting mode is set.

2. The imaging device according to claim 1, further comprising:
a strobe ON/OFF operation unit for receiving an operation of setting the flash generation unit to generate the flash regardless of an output from an imaging sensor, and an operation of setting the flash generation unit not to generate the flash, wherein
the controller is configured to control consecutive performances of the first shooting and second shooting regardless of the operation state of the strobe ON/OFF operation unit when the consecutive shooting mode is set.

3. The imaging device according to claim 2, further comprising:
a display unit for displaying a shot image, wherein
the display unit is configured to display both of a first image obtained by the first shooting and a second image obtained by the second shooting.

4. The imaging device according to claim 3, further comprising an image display controller configured to concurrently display the first image and the second image on the display unit.

5. The imaging device according to claim 3, further comprising an operation unit for receiving an operation of switching between a state of displaying the first image on the display unit and the state of displaying a second image on the display unit.

6. The imaging device according to claim 1, further comprising an image signal output unit for externally outputting the shot image signals.

7. The imaging device according to claim 1, further comprising a display unit for displaying each of the shot images in accordance with each of the shot image signals.

8. The imaging device according to claim 1, further comprising an image printing unit for printing each of the shot images in accordance with each of the shot image signals.

9. The imaging device according to claim 1, further comprising a recording unit for recording a first image obtained by the first shooting and a second image obtained by the second shooting.

10. The imaging device according to claim 4, wherein the display unit displays the first image and the second image side by side.

11. The imaging device according to claim 10, wherein the display unit displays only the first image and the second image as shot images.

12. The imaging device according to claim 11, further comprising a switching section for switching an operation mode of the imaging device between a shooting mode and a playback mode, wherein
the display unit automatically displays the first and the second image when the playback mode is set by the switching section.

13. An imaging device configured to shoot in a consecutive shooting mode in which a plurality of images are consecutively shot through one operation of shutter operation section, the imaging device comprising:
an image blur compensation unit; and
a flash generation unit; wherein
consecutive performances of a first shooting in a state that the flash generation unit is caused not to generate the flash and the image blur compensation unit is caused to compensate a blur of a image, and a second shooting in a state that the flash generation unit is caused to generate the flash and the image compensation unit is caused to compensate a blur of a image, are performed after only one operation of the shutter operation section by a shooter.

* * * * *